United States Patent [19]
Dobbelaere et al.

[11] Patent Number: 5,424,589
[45] Date of Patent: Jun. 13, 1995

[54] ELECTRICALLY PROGRAMMABLE INTER-CHIP INTERCONNECT ARCHITECTURE

[75] Inventors: Ivo J. Dobbelaere; Abbas El Gamal, both of Palo Alto, Calif.

[73] Assignee: The Board of Trustees of The Leland Stanford Junior University, Stanford, Calif.

[21] Appl. No.: 17,038

[22] Filed: Feb. 12, 1993

[51] Int. Cl.⁶ ............... H03K 19/173; G06F 7/38
[52] U.S. Cl. ................... 326/41; 364/716; 326/39; 326/45
[58] Field of Search ........... 307/465, 465.1, 468, 307/469; 364/716

[56] References Cited

U.S. PATENT DOCUMENTS

| | | | |
|---|---|---|---|
| Re. 34,363 | 8/1993 | Freeman | 307/465 |
| 4,608,504 | 8/1986 | Yamamoto | 307/475 |
| 4,642,487 | 2/1987 | Carter | 307/465 |
| 4,680,491 | 7/1987 | Yokouchi et al. | 307/473 |
| 4,756,006 | 7/1988 | Richard | 307/473 |
| 4,758,745 | 7/1988 | Elgamal et al. | 307/465 |
| 4,825,107 | 4/1989 | Naganuma et al. | 307/465 |
| 4,864,381 | 9/1989 | Seefeldt et al. | 307/465 |
| 4,866,508 | 9/1989 | Eichelberger et al. | 307/465 |
| 4,987,319 | 1/1991 | Kawana | 307/473 |
| 4,992,679 | 2/1991 | Takata et al. | 307/469 |
| 5,066,831 | 11/1991 | Spielberger et al. | 357/74 |
| 5,107,146 | 4/1992 | El-Ayat | 307/465 |
| 5,109,353 | 4/1992 | Sample et al. | 364/578 |
| 5,162,893 | 11/1992 | Okano | 257/203 |

Primary Examiner—Edward P. Westin
Assistant Examiner—Richard Roseen

[57] ABSTRACT

A user-programmable inter-chip interconnect architecture, which may be used for providing programmable interconnections among a plurality of integrated circuits, is disclosed. A plurality of main circuitry in the core region of an integrated circuit is connected through connection nodes to a programmable peripheral switch network in the frame region of the integrated circuit. The peripheral switch network may be programmed by the user to obtain the desired signal-propagating paths between said connection nodes and bonding pads of the peripheral switch network, or among bonding pads of the peripheral switch network. The peripheral switch network has intersecting wiring channels attached to the bonding pads and the connection nodes. Programmable junctions may be present at the intersections of the wiring channels. A substantial number of desired interconnections may be achieved that have only one such programmable junction in the signal-propagating path. When a plurality of integrated circuits including this architecture are mounted on a substrate that provides fixed conductive leads between the bonding pads of the integrated circuits, user-programmable, highly flexible, high-performance two-point and multi-point connections among the main circuitry of the integrated circuits are obtained.

21 Claims, 16 Drawing Sheets

ELECTRICALLY PROGRAMMABLE INTER-CHIP INTERCONNECT ARCHITECTURE

This invention was made with Government support under contract J-FBI-89-101 awarded by the U.S. Federal Bureau of Investigation. The Government has certain rights in the invention.

BACKGROUND OF THE INVENTION

The present invention relates to integrated circuit (IC) technology. More specifically, the present invention pertains to user-configurable interconnections among circuitry on different semiconductor chips in a multi-chip system.

Integrated circuits use a network of metal interconnects between individual semiconductor components, and are fabricated using a complicated process requiring a number of photolithographic masks extracted from the layout of the integrated circuits. The engineering cost of the layout and the fabrication cost of the photolithographic masks for a fully custom-designed integrated circuit is very high and can only be economically justified if the number of ICs to be produced is substantial. In addition, the production of such ICs with a fully customized design has a long delivery time. The development of user-programmable logic arrays, with programmable logic elements or modules, as illustrated in U.S. Pat. No. Re. 34,363 (Reissued) to Freeman, included herewith by reference, commonly known as Field Programmable Gate Arrays (FPGAs) has provided the user with an economical means to implement logic designs of relatively low complexity, with a short delivery time and with a reasonable performance. One measure of complexity of a logic design is the number of logic gates that is needed to implement that design.

These FPGAs roughly have a common architecture, consisting of an array of logic modules interspersed with a programmable interconnect architecture. The logic modules may or may not have programmability. The I/O pads may be programmed to be an input, an output, or a bidirectional I/O circuit for use in a bus. Different programming technologies, such as anti-fuses, non-volatile memory elements, memory element controlled switches, etc. may be used.

FPGAs are widely used in digital system design, for implementing many logic functions that otherwise would be implemented using a plurality of commercially available logic chips (so-called "glue-logic"). The use of FPGAs for prototyping and emulation of small integrated circuits under development has proven particularly useful to IC manufacturers. Time consuming computer simulations can be replaced by much faster emulations. Mistakes in an IC design may be found early on in the design process, saving both time and money.

However, due to the large overhead in die area for providing user-programmability, the maximum complexity IC-design that can be successfully implemented in a single FPGA is at least an order of magnitude smaller than the maximum complexity IC-design that can be implemented in a custom designed IC using the same semiconductor technology.

In order to implement, prototype or emulate very large logic designs, such as VLSI (Very Large Scale Integration) ICs, a plurality of FPGAs, possibly in combination with other, dedicated ICs such as memory chips, arithmetic units, processor units, etc. may be used, mounted together on a substrate (such as a PCB, a Printed Circuit Board; or an MCM, a Multi-Chip Module). The substrate provides routing between the bonding pads of the ICs. It is not economically feasible to produce customized routing substrates for every application. Instead, a fixed, well-chosen interconnect network must be present on the substrate, such that the same substrate with the ICs may be used successfully for many applications. We will refer to such a substrate with FPGAs and possibly other ICs on it as a "user-programmable multi-chip system".

The quality of a user-programmable multi-chip system may be expressed as a combination of two measures: the first measure is the performance at which an implemented design may be emulated, and the second measure is the area efficiency. The performance may roughly be calculated as the inverse of the maximum propagation delay along the critical path of an implementation. The area efficiency may be defined as the average number of logic gates implemented per unit area of the system, and may roughly be calculated as the product of a packaging technology-dependent factor and the "gate utilization". The "gate utilization" is a commonly used measure for FPGAs, and may be defined as the number of gates used towards implementing the logic design, divided by the total number of gates available on the FPGAs. The gate utilization is strongly dependent on the "flexibility" of the programmable routing architecture. The "flexibility" of a programmable routing architecture may be measured roughly as the number of programmable elements used in the programmable routing architecture.

U.S. Pat. No. 5,109,353 to M. D'Amour et al discloses an apparatus for emulation of electronic hardware systems using a plurality of FPGAs (Field Programmable Gate Arrays), richly interconnected through a fixed interconnect network and using a workstation for entering data and for programming the FPGAs. However, since this apparatus is directed to use with FPGAs that do not include the architecture of the present invention, it does not offer the merits of the present invention. More specifically, since in a multi-chip system the substrate only contains fixed interconnects, all flexibility of the inter-chip routing must be contained inside the integrated circuits, for example by providing fast, programmable interconnections among the I/O pads of the chips. The FPGAs used in this apparatus were not intended for use in a multi-chip system, and do not provide fast interconnections among a substantial number of their I/O pads.

In order to improve the performance of such an emulation apparatus, specialized routing chips may additionally be included in the array of integrated circuits mounted on the substrate. Such switching chips may consist of programmable switch networks such as programmable switch matrices or programmable multiplexers. Thus, the flexibility of the inter-chip routing is concentrated inside these switching chips. While this approach may increase the performance of the obtained multi-chip system, it does not offer the merits of compactness and modularity offered by the current invention.

U.S. Pat. No. 4,642,487 to W. Carter discloses a user-programmable special interconnect for a logic array. The architecture provides flexibility between the I/O pads and internal nodes through programmable junctions; and it also provides flexibility among the I/O pads. However, that architecture is not directed to providing fast, flexible interconnections among I/O pads, and due to a different architecture, it does not provide the performance offered by the present invention, since it requires signals to travel through at least two programmable junctions and at least one intermediate wire segment in order to go from one I/O pad to another.

U.S. Pat. No. 4,758,745 to A. Elgamal et al discloses a user-programmable integrated circuits interconnect architecture and test method. However, that architecture is directed to solving the routing problem among modules on one integrated circuit and does not address the interconnection among I/O pads.

U.S. Pat. No. 5,107,146 to K. A. El-Ayat discloses a mixed mode analog/digital programmable interconnection architecture. The architecture provides flexibility between the I/O pads and the circuitry on the integrated circuit and also among some of the I/O pads. However, that architecture is not directed to providing fast, flexible interconnections among I/O pads, and due to a different interconnection architecture, it does not offer the performance and flexibility offered by the present invention.

U.S. Pat. No. 5,162,893 to Y. Okano et al discloses a semiconductor integrated circuit device with an enlarged internal logic circuit area, obtained by adding specific peripheral circuits. However, that architecture is directed to providing additional area for logic and does not provide flexible interconnections among bonding pads or between bonding pads and the nodes of the main circuitry.

U.S. Pat. No. 5,066,831 to R. K. Spielberger et al discloses a universal semiconductor chip package having programmable pads located on a surface of the package. However, that approach is directed to providing programmable connections between the pads of an integrated circuit and the pins of its package. Moreover, it does not integrate the programmable circuits on the same integrated circuit as the main circuitry, as is the case in the present invention.

Whatever the precise merits, features and advantages of the above cited references and approaches, none of them achieves or fulfills the purposes of the user-programmable inter-chip interconnect architecture of the present invention.

The present invention also pertains to multi-processors. A multi-processor is a computation apparatus that includes a plurality of processor units. These processor units may be mounted on a substrate, together with other integrated circuits such as memory, arithmetic units, etc. It is known in the art that it is advantageous to have fast, programmable interconnections between these processor units. The programmable inter-chip interconnection architecture of the current invention may be used with such processor units and possibly with other integrated circuits.

The present invention also pertains to digital signal multi-processors. One application of digital signal processors is to encode and decode data in order to reliably and efficiently store or transmit it. Depending on the data type and the type of storage or the type of transmission channel, different encoder and decoder algorithms exist. Such algorithms all share logic blocks such as multipliers and discrete cosine transform units, etc. as known in the art. The programmable interchip interconnection architecture of the current invention may be used with such blocks so that a plurality of encoding and decoding algorithms and other algorithms may be performed.

OBJECTS OF THE INVENTION

Accordingly, it is a principal object of the invention to provide an improvement to an integrated circuit, by including a user-programmable inter-chip interconnect architecture, that allows programmable, flexible, high performance signal-propagating paths not only between the bonding pads of the integrated circuit and the nodes to the main circuits on the integrated circuit, but also among the bonding pads, thus eliminating the need for additional specialized switching chips when used in an array.

An additional object of the invention is to improve integrated circuits by including a user-programmable inter-chip interconnect architecture, such that they can be used as the basic units for a user-programmable multi-chip system directed to the implementation of high complexity semi-custom ICs or to the proto-typing and emulation of Very Large Scale Integration (VLSI) ICs, with higher complexity, higher area efficiency, higher gate utilization, higher reliability and higher performance than existing user programmable multi-chip systems for such purposes.

An additional object of the invention is to improve integrated circuits by including a user-programmable inter-chip interconnect architecture, such that they can be used as the basic units for a user programmable multi-processor system with higher complexity, higher area efficiency, higher reliability and higher performance than existing multi-processor systems.

An additional object of the invention is to improve integrated circuits by including a user-programmable inter-chip interconnect architecture, such that they can be used as the basic units for a user programmable digital signal multiprocessor system with higher complexity, higher area efficiency, higher reliability and higher performance than existing digital signal multi-processor systems.

Other objects and features of the invention will become apparent to those skilled in the art in light of the following description and drawings of the preferred embodiment.

BRIEF DESCRIPTION OF THE INVENTION

In accordance with the present invention, an electrically programmable inter-chip interconnect architecture is disclosed. In a multi-chip system consisting of a plurality of integrated circuits that are mounted together on a substrate containing fixed conductive leads, this architecture provides fast, flexible programmable interconnections among the integrated circuits, thus improving the performance and the routing flexibility of the multi-chip system.

In one embodiment, a programmable peripheral switch network is included in the frame region of each integrated circuit. The peripheral switch network provides fast programmable interconnections between a plurality of bonding pads and a plurality of connection nodes of the main circuitry in the core region of each integrated circuit; and among a plurality of bonding pads of each integrated circuit. Programmable bidirectional I/O buffering circuits are provided that may be programmed to drive conductive leads of the substrate, external to the integrated circuits.

The fast programmable interconnections in the peripheral switch network are obtained by having intersecting wiring channels attached to the bonding pads. These wiring channels consist of either a conductive lead attached to a programmable bidirectional I/O buffering circuit, which in turn is attached to the bonding pad; or a conductive lead attached to a programmable bidirectional I/O buffering circuit, which in turn is attached to a second conductive lead, which is attached to the bonding pad; or a single conductive lead directly connected to the bonding pad. At the intersections of the conductive leads, programmable junctions may be present, for interconnecting pairs of wiring channels.

A plurality of first connection nodes, present for the purpose of transferring signals to and from the main circuitry in the core region, has conductive leads that intersect with the conductive leads of said wiring channels. At those intersections, programmable junctions may be present as well. A plurality of second connection nodes may be present, also for transferring signals to and from the main circuitry, which each are directly connected to a conductive lead of said wiring channels.

A variety of connections between connection nodes and bonding pads, or among bonding pads, may be obtained, each having not more than one of said programmable junctions in the signal propagation path.

This programmable inter-chip interconnect architecture, in combination with the fixed conductive leads of the substrate, may be used to implement a variety of fast, flexible interconnections between the main circuitry of different integrated circuits.

By matching the wiring channel types with the wiring capacitances of the substrate conductive leads, the designer may obtain interconnections with minimized propagation delays.

BRIEF DESCRIPTION OF THE DRAWINGS

FIG. 5a, 5b and 5c show embodiments of the controllable I/O circuit of the programmable bidirectional I/O buffering circuit in FIG. 4a;

FIG. 6b and 6c show embodiments of the switch in FIG. 6a;

DETAILED DESCRIPTION OF SPECIFIC EMBODIMENTS

Conference article "Field Programmable M CM Systems—Design of an Interconnection Frame," by I. Dobbelaere et al, presented at the first international ACM (Association for Computing Machinery)/SIGDA (Special Interest Group on Design Automation) workshop on Field Programmable Gate Arrays (FPGA'92), pp. 52–56, on a user-programmable multi-chip system, is incorporated herein by reference.

It is necessary to explain the multi-chip system described in the above reference in order to explain the electrically programmable inter-chip interconnect architecture of the present invention.

Figure 1:
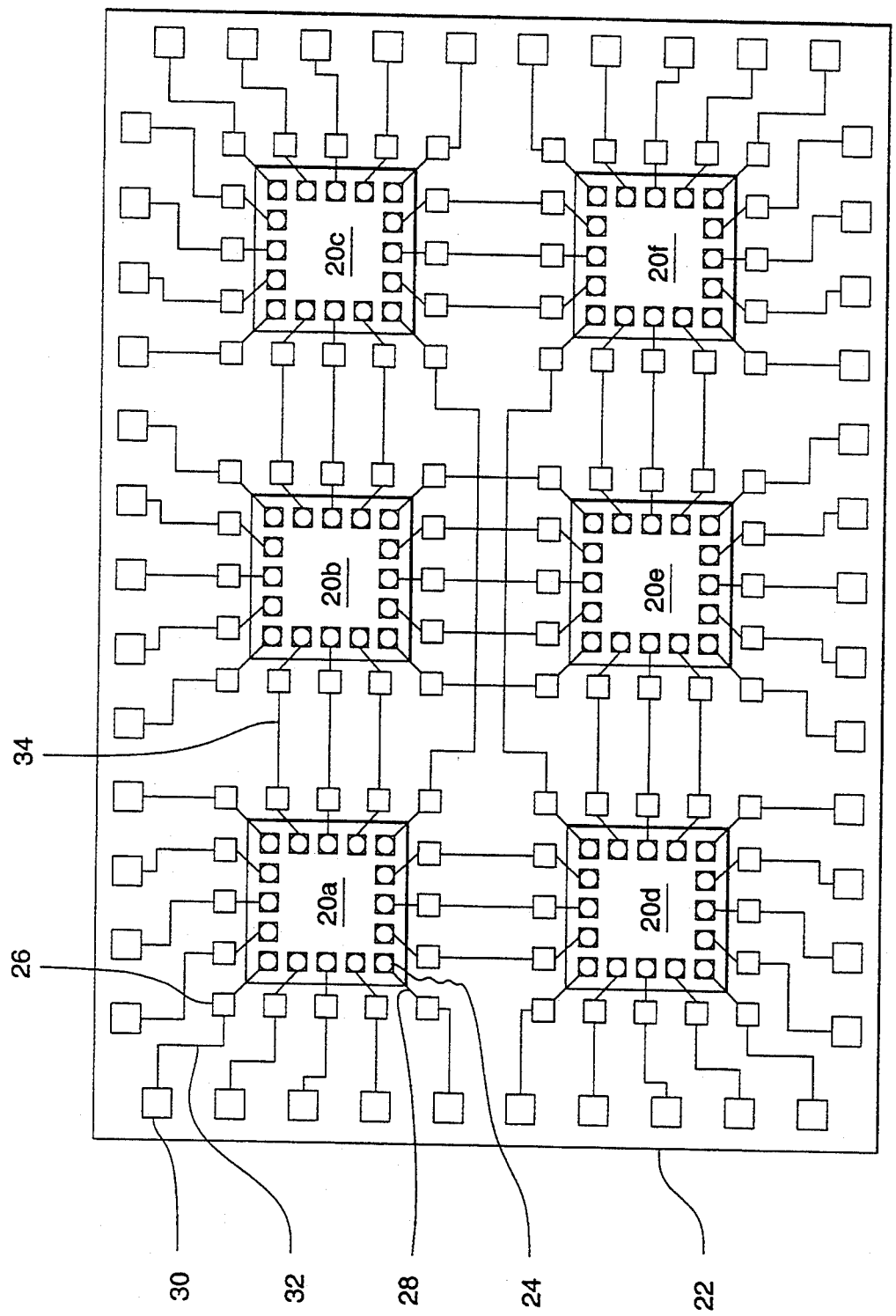
FIG. 1 is a view of an illustrative embodiment of a multi-chip system.

FIG. 1 depicts an illustrative embodiment of a multi-chip system consisting of six integrated circuits 20a–20f, mounted on a substrate 22. A plurality of bonding pads 24 are provided on integrated circuits 20a–20f for the purpose of transferring signals to and from the integrated circuit, and for providing power supply voltages, etc. We have used a symbol consisting of a circle inscribed in a square to represent the bonding pads of the integrated circuits. A plurality of component contacts 26 are provided on substrate 22, corresponding to and connected to bonding pads 24 of integrated circuits 20a–20f by bonding wires 28.

Substrate 22 may be a printed circuit board, or any type of multi-chip module. Any type of bonding technique, such as wire bonding, tape automated bonding, solder bump bonding, etc. as known in the art may be used between integrated circuits 20a–20f and substrate 22.

Substrate 22 also includes a plurality of conductive leads 34 that each interconnect at least two component contacts 26 of different integrated circuits 20a–20f, thus providing fixed interconnections between bonding pads 24 of different integrated circuits 20a–20f. Substrate 22 further includes a plurality of external contacts 30, for the purpose of transferring signals to and from the multi-chip system., and for providing power supply voltages, etc. Substrate 22 also includes a plurality of conductive leads 32 that each interconnect at least one component contact 26 and one external contact 30, thus providing a fixed interconnection between external contacts 30 and bonding pads 24 of integrated circuits 20a-20f on substrate 22.

It is clear from the above description that conductive leads 32 and 34 of substrate 22 can be designed to accommodate any set of required interconnections among integrated circuits 20a-20f and between integrated circuits 20a-20f and external contacts 30.

Figure 2:
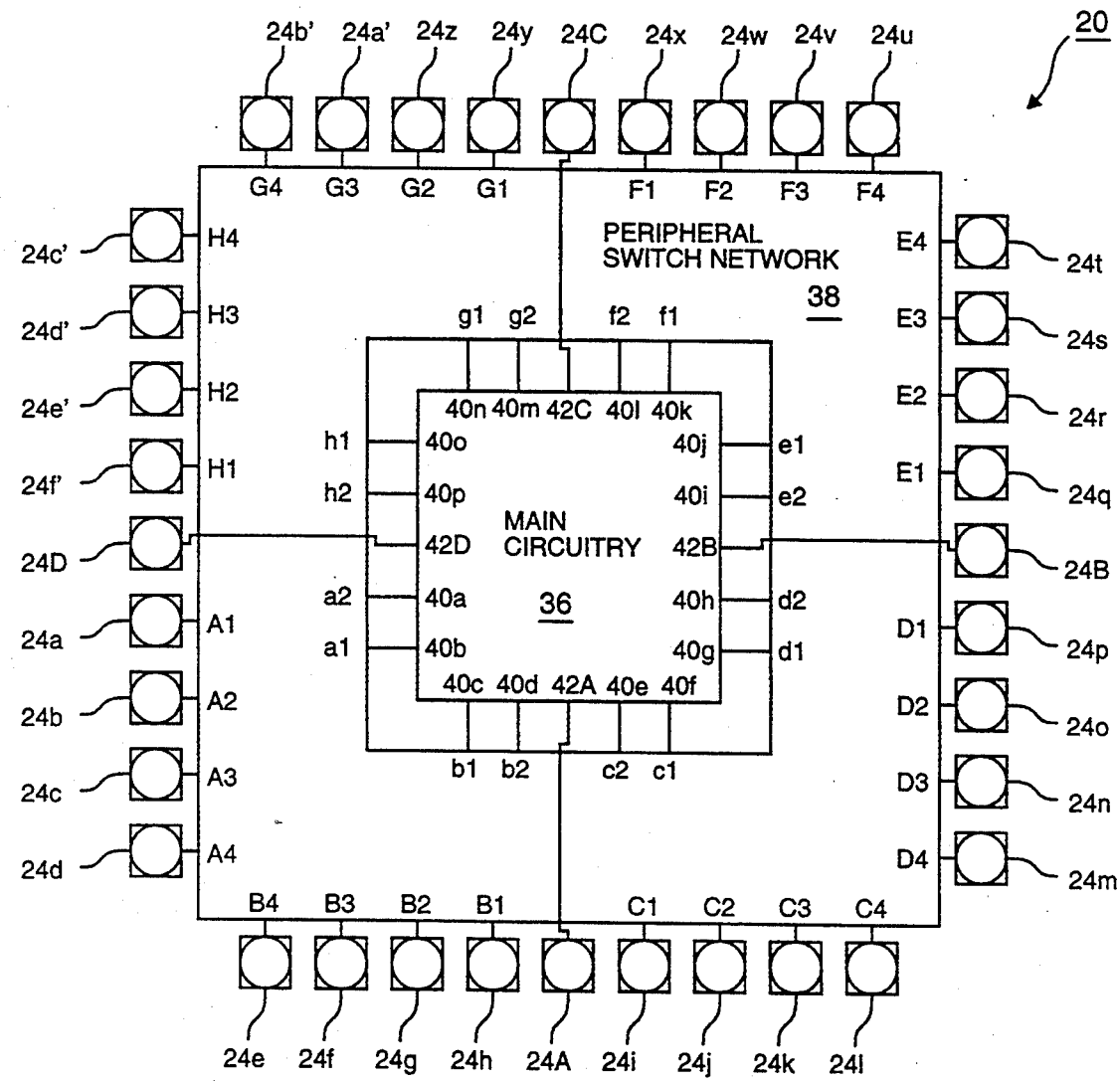
FIG. 2 is a block diagram of a preferred embodiment of an integrated circuit containing an electrically programmable inter-chip interconnect architecture according to the present invention.

Referring now to FIG. 2, a block diagram of a preferred embodiment of the invention, one may see an integrated circuit 20, having a plurality of circuitry 36, further referred to as "main circuitry 36", in its core region, and having a peripheral switch network 38 in its frame region. The block diagram of FIG. 2 has been drawn to reflect the layout of integrated circuit 20.

A plurality of connection nodes 40a-40p is provided on main circuitry 36 for the purpose of transferring signals between main circuitry 36 and peripheral switch network 38.

A plurality of connection nodes a1-a2, b1-b2, c1-c2, d1-d2, e1-e2, f1-f2, g1-g2, h1-h2 is provided on peripheral switch network 38, each corresponding to and connected to one of connection nodes 40a-40p of main circuitry 36. Through connection nodes 40a-40p and a1-a2, b1-b2, c1-c2, d1-d2, e1-e2, f1-f2, g1-g2, h1-h2 signals may be transferred between main circuitry 36 and peripheral switch network 38.

Switch network 38 also includes a plurality of terminals A1-A4, B1-B4, C1-C4, D1-D4, E1-E4, F1-F4, G1-G4, H1-H4 each connected to one of a plurality of bonding pads 24a-24z, 24a'-24f' for the purpose of transferring signals between peripheral switch network 38 and devices external to integrated circuit 20 through the component contacts of the substrate to peripheral switch network 38.

Main circuitry 36 also includes a plurality of terminals 42A-42D, which each are connected to one of a: plurality of bonding pads 24A-24D of integrated circuit 20, for the purpose of transferring signals between main circuitry 36 and devices external to integrated circuit 20 through the component contacts of the substrate to main circuitry 36.

For clarity, the bonding pads that provide the power supplies and control signals for peripheral switch network 38 and for main circuitry 36 have been omitted in FIG. 2.

The functionality of main circuitry 36 is limited only by the imagination of the designer and may be chosen from user-programmable gate arrays, memories, microprocessors, digital signal processors, arithmetic units, neural networks, electro-optical interfaces for fiber optics communications, CCDs, analog circuitry, etc. as known in the art. The number of connection nodes 40a-40p and terminals 42A-42D of main circuitry 36, the number of connection nodes a1-a2, b1-b2, ..., h1-h2 and terminals A1-A4, B1-B4, ..., H1-H4 of peripheral switch network 38, and the number of bonding pads 24a-24z, 24a'-24f' and 24A-24D may be changed within the limits imposed by technology in order to accommodate the interconnection needs of particular designs. These interconnection needs are dictated by circuit density and other well-understood factors.

Figure 3:
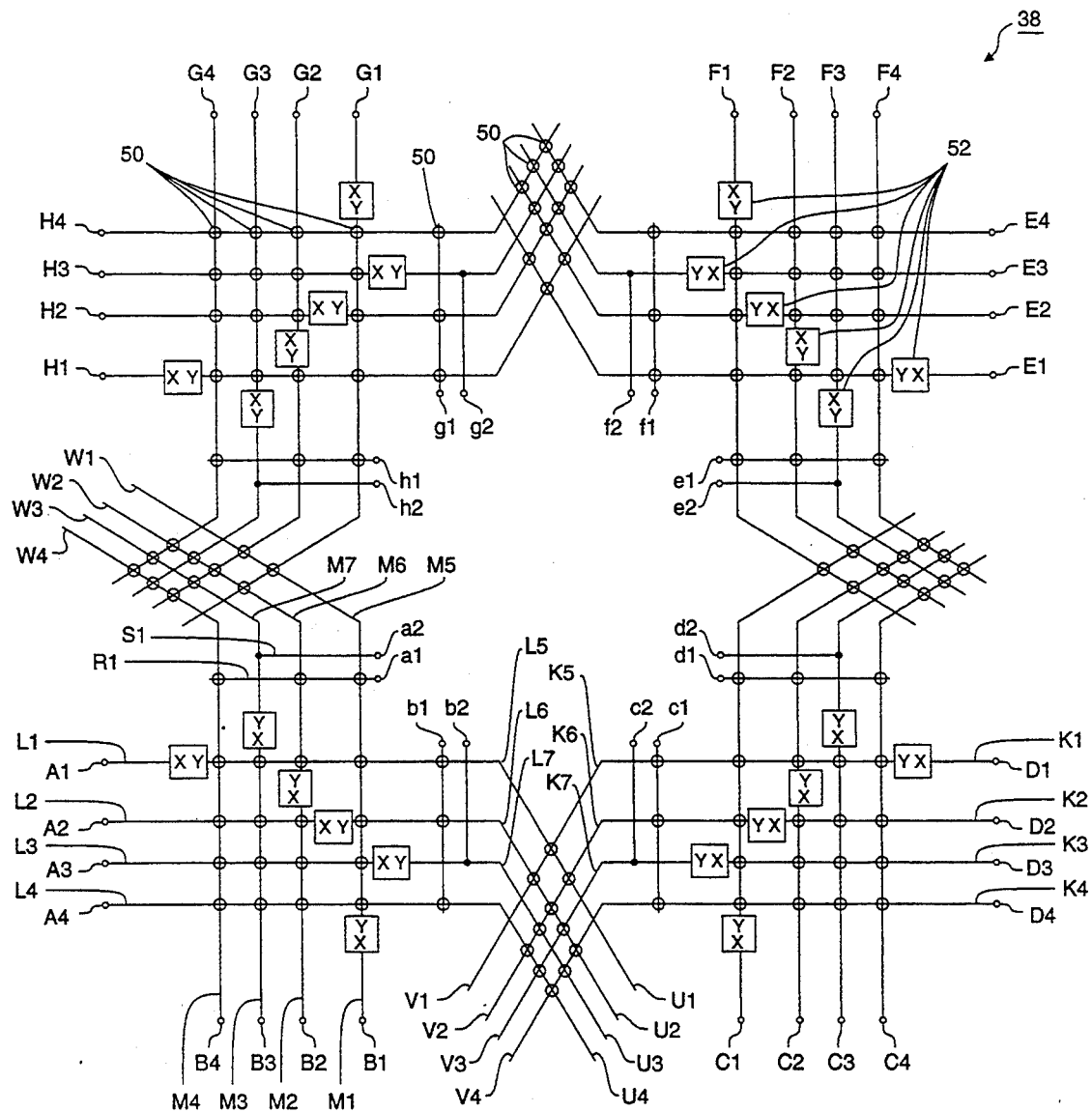
FIG. 3 illustrates a preferred embodiment of the peripheral switch network in the frame region of the integrated circuit in FIG. 2.

Turning now to FIG. 3, a preferred embodiment of peripheral switch network 38 is shown. The same reference labels are used in FIGS. 2 and 3 for like elements.

One may see a plurality of terminals A1-A4, B1-B4, C1-C4, D1-D4, E1-E4, F1-F4, G1-G4, H1-H4, each connected to a wiring channel U1-U4, V1-V4, W1-W4, etc. In FIG. 3, the wiring channels connected to terminals A1 through A4 are labeled U1 through U4, respectively; the wiring channels connected to terminals D1 through D4 are labeled V1 through V4, respectively; and the wiring channels connected to terminals B1 through B4 are labeled W1 through W4, respectively. The wiring channels connected to the other terminals are indicated schematically but are not labeled for the sake of clarity.

Three wiring Channel types may be present:

Wiring channel U1 connected to terminal A1 is an embodiment of a first wiring channel type, and consists of a conductive lead L5, connected to terminal Y of a programmable bidirectional I/O buffering circuit 52. Terminal X of programmable bidirectional I/O buffering circuit 52 is connected to a conductive lead L1 which is connected to terminal A1. We will further refer to programmable bidirectional I/O buffering circuit 52 simply as "programmable I/O circuit 52". For clarity, not all programmable I/O circuits 52 that are indicated schematically in FIG. 3 have been labeled.

Programmable I/O circuit 52, as will be described in detail later, may be programmed to at least two states: in a first state, further referred to as the "INPUT STATE", programmable I/O circuit 52 is configured to propagate a signal from its terminal X to its terminal Y; in a second state, further referred to as the "OUTPUT STATE", programmable I/O circuit 52 is configured to drive its terminal X with an enhancement of the signal appearing on its terminal Y. More programming states may be provided in the embodiments of programmable I/O circuit 52.

It is clear that by programming the programmable I/O circuit 52 of wiring channel U1 to the "INPUT STATE", a path may be obtained that propagates a signal from terminal A1, through conductive lead L1, through programmable I/O circuit 52, to conductive lead L5. Conversely, by programming the programmable I/O circuit 52 of wiring channel U1 to the "OUTPUT STATE", a path may obtained that propagates a signal from conductive lead L5 through programmable I/O circuit 52, through conductive lead L1, to terminal A1.

Similarly, wiring channel W1, V1, and the wiring channels connected to terminals C1, E1, F1, G1 and H1 are also embodiments of this first wiring channel type.

Wiring channel U2 connected to terminal A2 is an embodiment of a second wiring channel type, and consists of a conductive lead L6, connected to terminal Y of a programmable I/O circuit 52. Terminal X of programmable I/O circuit 52 is connected to a conductive lead L2 which is connected to terminal A2.

It is clear that by programming the programmable I/O circuit 52 of wiring channel U2 to the "INPUT STATE", a path may obtained that propagates a signal from terminal A2, through conductive lead L2, through programmable I/O circuit 52, to conductive lead L6. Conversely, by programming the programmable I/O circuit 52 of wiring channel U2 to the "OUTPUT STATE", a path may obtained that propagates a signal from conductive lead L6 through programmable I/O circuit 52, through conductive lead L2, to terminal A2.

Wiring channel U3 connected to terminal A3 is another embodiment of this second wiring channel type, and consists of a conductive lead L7 connected to terminal Y of a programmable I/O circuit 52. Terminal X of programmable I/O circuit 52 is connected to a conductive lead L3 which is connected to terminal A3. Similarly, wiring channels V2, V3, W2, W3, and the wiring channels connected to terminals C2, C3, E2, E3, F2, F3, G2, G3, H2 and H3 are also embodiments of this second wiring channel type.

Wiring channel U4 connected to terminal A4 is an embodiment of a third wiring channel type, and consists of a single conductive lead L4, directly connected to terminal A4. It is clear that a signal appearing on terminal A4 also appears on conductive lead L4, and vice-versa. Similarly, wiring channels V4, W4, and the wiring channels connected to terminals C4, E4, F4, G4 and H4 are also embodiments of this third wiring channel type.

The conductive leads of wiring channels V1-V4 and W1-W4 have been labeled K1-K7 and M1-M7. The conductive leads of the other wiring channels in FIG. 3 are indicated schematically, but are not labeled for clarity.

Between pairs of conductive leads belonging to intersecting wiring channels, programmable junctions 50 may be present for the purpose of making interconnections between pairs of wiring channels. Programmable junctions 50 are shown symbolically in FIG. 3 as circles disposed at crosspoints between intersecting ones of conducting leads L1-L7, K1-K7, M1-M7, etc. For clarity, not all programmable junctions 50 that are indicated schematically in FIG. 3 have been labeled.

As will be described in detail later, a programmable junction 50 may be programmed to two states: in a first state, further referred to as the "CONDUCTING STATE", programmable junction 50 is configured to bidirectionally conduct signals between the two conductive leads it is connected to; in a second state, further referred to as the "NON-CONDUCTING STATE", programmable junction 50 is configured to provide a very high impedance between the two conductive leads it is connected to.

By programming programmable junctions 50 and programmable I/O circuits 52, signal propagating paths may be obtained among terminals A1-A4, B1-B4, C1-C4, D1-D4, E1-E4, F1-F4, G1-G4, H1-H4. For example, by programming the programmable I/O circuit 52 between conductive leads L1 and L5 to the "INPUT STATE", a signal propagating path may be obtained from terminal A1 through conductive lead L1, through programmable I/O circuit 52, to conductive lead L5. By programming of programmable junction 50 at the intersection of conductive leads L5 and M6 to the "CONDUCTING STATE", the signal may be further propagated from conductive lead L5 to conductive lead M6. By programming of programmable I/O circuit 52 between conductive leads M6 and M2 to the "OUTPUT STATE", the signal on conductive lead M6 may further be propagated to conductive lead M2 and to terminal B2. Still in this example, it is assumed that the other programmable junctions 50 on conductive leads L5, M6 and M2 of this signal-propagating path are programmed to the "NON-CONDUCTING STATE". Hence, a signal propagating path was obtained from terminal A1 to terminal B2. Similarly, signal propagating paths may be obtained between terminals A1-A4 and B1-B4; between terminals C1-C4 and D1-D4; between terminals E1-E4 and F1-F4; and between terminals G1-G4 and H1-H4.

The first wiring channel type, for example wiring channel U1 connected to terminal A1, only has programmable junctions 50 on conductive lead L5, connected to terminal Y of programmable I/O circuit 52. Conductive lead L1 between terminal X of programmable I/O circuit 52 and terminal A1 has no programmable junctions 50, and its only purpose is to provide a connection between terminal X of programmable I/O circuit 52 and terminal A1. Bonding pad A1, conductive lead L1, and programmable I/O circuit 52 combined form a unit that is usually referred to as an "I/O pad". In order to dedicate terminal A1 to be an output of peripheral switch network 38, the attached programmable I/O circuit 52 must be programmed to the "OUTPUT STATE", in which it drives its terminal X with an enhancement of the signal appearing on its terminal Y. Similarly, in order to dedicate terminal A1 to be an input of peripheral switch network 38, the attached programmable I/O circuit 52 must be programmed to the "INPUT STATE", in which it propagates signals from its terminal X to its terminal Y. The same explanation also holds for the other wiring channels that are of the first type, more specifically wiring channels U1, V1, W1, etc., connected to terminals A1, B1, ..., H1.

The second wiring channel type, for example wiring channel U2 connected to terminal A2, has programmable junctions 50 on conductive lead L2 connected between terminal A2 and terminal X of programmable I/O circuit 52, and also has programmable junctions 50 on conductive lead L6 connected to terminal Y of programmable I/O circuit 52. Consequently, dedicating terminal A2 to be an output of peripheral switch network 38 may be achieved either by programming the programmable I/O circuit 52 to the "OUTPUT STATE", in which it drives its terminal X with an enhancement of the signal appearing on its terminal Y; or by programming one of programmable junctions 50 connected to conductive lead L2 to the "CONDUCTING STATE". In the latter case, the signal appearing on node A2 has not been enhanced by a programmable I/O circuit 52. This feature avoids the propagation delay associated with programmable I/O circuit 52, and therefore may be desired when the conductive leads of the substrate have a small wiring capacitance.

Similarly, dedicating terminal A2 to be an input of the peripheral switch network may be achieved either by programming programmable I/O circuit 52 to the "INPUT STATE", in which it propagates signals from its terminal X to its terminal Y; or by programming one of programmable junctions 50 connected to conductive lead L2 to the "CONDUCTING STATE". The same explanation also holds for the other wiring channels that are of the second type, more specifically wiring channels U2-U3, V2-V3, W2-W3, etc., connected to terminals A2-A3, B2-B3, ..., H2-H3.

The third wiring channel type, for example wiring channel U4 connected to terminal A4, has programmable junctions 50 on conductive lead L4. Consequently, dedicating terminal A4 to be an input or an output of peripheral switch network 38 may be achieved only by programming one of programmable junctions 50 connected to conductive lead L4 to the "CONDUCTING STATE". The same explanation also holds for the other wiring channels that are of the third type, more specifically wiring channels U4, V4, etc. connected to terminals A4, B4, ..., H4.

Peripheral switch network 38 depicted in FIG. 3 further also includes a plurality of connection nodes a1, b1, c1, d1, e1, f1, g1, h1 for transferring signals to and from the main circuitry of the integrated circuit, each connected to a conductive lead R1, etc. Connection node a1 is connected to conductive lead R1. The conductive leads connected to connection nodes b1, c1, d1, e1, f1, g1, h1 have been indicated schematically in FIG. 3, but have not been labeled, for the sake of clarity. At the intersections between conductive leads R1, etc. connected to connection nodes a1, b1, c1, d1, e1, f1, g1, h1 and conductive leads L1-L7, K1-K7, M1-M7, etc. of wiring channels U1-U4, V1-V4, W1-W4, etc., programmable junctions 50 may be present. Consequently, by programming programmable junctions 50, connection nodes a1, b1, ..., h1 may be dedicated to transfer signals from the peripheral switch network to the main circuitry; or conversely.

Peripheral switch network 38 depicted in FIG. 3 also includes a plurality of connection nodes a2, b2, c2, d2, e2, f2, g2, h2 for transferring signals to and from the main circuitry of the integrated circuit, each connected to a conductive lead S1, etc. Connection node a2 is connected to a conductive leads S1. The conductive leads connected to connection nodes b2, c2, d2, e2, f2, g2, h2 have been indicated schematically in FIG. 3, but have not been labeled for the sake of clarity. Conductive leads S1, etc. connected to connection nodes a2, b2, c2, d2, e2, f2, g2, h2 are each directly connected to one of conductive leads L1-L7, K1-K7, M1-M7, etc. of wiring channels U1-U4, V1-V4, W1-W4, etc. Consequently, connection nodes b2, c2, d2, e2, f2, g2, h2 may be used to transfer signals from the peripheral switch network to the main circuitry; or conversely.

For clarity, the programming circuitry, the Electo-Static Discharge protection circuitry, as well as the terminals that provide the power supplies and control signals for peripheral switch network 38 have been omitted in FIG. 3.

The number of terminals, wiring channels of first, second and third type, connection nodes, and the number of programmable junctions placed at cross-points in the interconnect architecture may all be varied to accommodate the needs of a particular design.

Figure 4A:
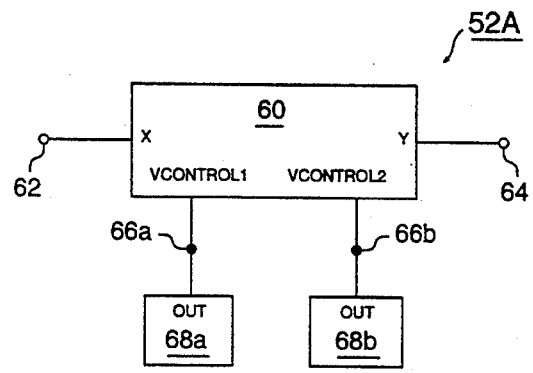
FIG. 4a, 4b and 4c show embodiments of the programmable bidirectional I/O buffering circuit of the peripheral switch network in FIG. 3.

FIG. 4a shows a block diagram of a first embodiment of programmable I/O circuit 52 of FIG. 3, here referred to with label 52A. Programmable I/O circuit 52A of FIG. 4a includes a controllable I/O circuit 60 having a terminal X connected to a node 62, and having a terminal Y connected to a node 64. Terminals X and Y of controllable I/O circuit 60 of FIG. 4a correspond to terminals X and Y of programmable I/O circuit 52 of FIG. 3.

Terminal X of controllable I/O circuit 60 of FIG. 4a is intended for connection to a conductive lead that is connected to a bonding pad. For example, now referring back to FIG. 3, the terminal X of programmable I/O circuit 52 of wiring channel U1 is connected to conductive lead L1, which is connected to terminal A1. Now referring to FIG. 2, one may see that terminal A1 is connected to bonding pad 24A.

Terminal Y of controllable I/O circuit 60 of FIG. 4a is intended for connection to a conductive lead that is not connected to a bonding pad. For example, now referring back to FIG. 3, the terminal Y of programmable I/O circuit 52 of wiring channel U1 is connected to conductive lead LS, which is not directly connected to any bonding pad.

Now again referring to FIG. 4a, controllable I/O circuit 60 also includes two control inputs VCONTROL1 and VCONTROL2, connected to two control nodes 66a and 66b, that are connected to two programmable elements 68a and 68b, respectively. Programmable elements 68a and 68b can each individually be programmed by the user to have either a high or a low logic level at their output. Programmable I/O circuit 52A has three distinct programming states:

Controllable I/O circuit 60 is configured to drive node 62 with an enhancement of the signal appearing on node 64 when its control voltage inputs appearing on control nodes 66a and 66b are set to a first combination of logic levels. This programming state is the "OUTPUT STATE". The signal enhancement is intended for the purpose of driving a conductive lead of the substrate. For example, now referring to FIG. 1, for driving one of conductive leads 32 or 34 of substrate 22. The driving strength of controllable I/O circuit 60 is dictated by the electrical characteristics of the conductive lead it drives and other well-understood factors.

Now referring to FIG. 4a again, controllable I/O circuit 60 is configured to propagate signals appearing on node 62 to node 64 when control nodes 66a and 66b are set to a second combination of logic levels. This programming state is the "INPUT STATE".

Controllable I/O circuit 60 is configured to not propagate signals between node 62 and node 64 when control nodes 66a and 66b are set to a third combination of logic levels. This programming state is further referred to as the "DISCONNECT STATE".

Figure 4B:
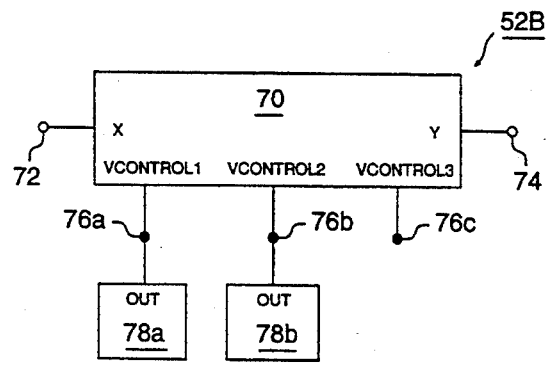

FIG. 4b shows a block diagram of a second embodiment of programmable I/O circuit 52 of FIG. 3, here referred to with label 52B. Programmable I/O circuit 52B of FIG. 4b includes a controllable I/O circuit 70 having a terminal X connected to a node 72, and having a terminal Y connected to node 74. Terminals X and Y of controllable I/O circuit 70 of FIG. 4b correspond to terminals X and Y of programmable I/O circuit 52 of FIG. 3.

Terminal X of controllable I/O circuit 70 of FIG. 4b is intended for connection to a conductive lead that is connected to a bonding pad, and terminal Y of controllable I/O circuit 70 of FIG. 4b is intended for connection to a conductive lead that is not connected to a bonding pad.

Controllable I/O circuit 70 also includes two control inputs VCONTROL1 and VCONTROL2, connected to two control nodes 76a and 76b, that are connected to two programmable elements 78a and 78b, respectively. Programmable elements 78a and 78b can each individually be programmed by the user to have either a high or a low logic level at their output. Controllable I/O circuit 70 has a third control input VCONTROL3, connected to a node 76c. In this embodiment, node 76c is directly connected to a control signal. This control signal may either originate inside main circuitry 36 of FIG. 2, or inside peripheral switch network 38 of FIG. 2; or it may originate in a device external to integrated circuit 20 of FIG. 2, through a bonding pad. Programmable I/O circuit 52B has four programming states:

Controllable I/O circuit 70 is configured to drive node 72 with an enhancement of the signal appearing on node 74 when its control voltage inputs appearing on control nodes 76a and 76b are set to a first combination of logic levels. This programming state is the "OUTPUT STATE". As was the case for the "OUTPUT STATE" of programmable I/O circuit 52A of FIG. 4a, the signal enhancement is intended for the purpose of driving a conductive lead of the substrate.

Now referring to FIG. 4b again, controllable I/O circuit 70 is configured to propagate signals appearing on node 72 to node 74 when control nodes 76a and 76b are set to a second combination of logic levels. This programming state is the "INPUT STATE".

Controllable I/O circuit 70 is configured to not propagate signals between node 72 and node 74 when control nodes 76a and 76b are set to a third combination of logic levels. This programming state is the "DISCONNECT STATE".

When control nodes 76a and 76b are set to a fourth combination of logic levels, and control node 76C is set to a first logic level, controllable I/O circuit 70 is configured to drive node 72 with an enhancement of the signal appearing on node 74. When control nodes 76a and 76b are set to this fourth combination of logic levels, and control node 76c is set to a second logic level, controllable I/O circuit 70 is configured to propagate the signal appearing on node 72 to node 74. It is clear that when control nodes 76a and 76b are set to the fourth combination of logic levels, the signal on control node 76c dictates controllable I/O circuit 70 to either drive node 72 with an enhancement of the signal appearing on node 74, or to propagate the signal appearing on node 74 to node 72. It is clear to those of ordinary skill in the art that such a feature may be used to obtain I/O circuits for use with buses. It is also clear that the signal on node 76c may be variable during operation. As mentioned earlier, this signal may either originate inside main circuitry 36 of FIG. 2, or inside peripheral switch network 38 of FIG. 2; or it may originate in a device external to integrated circuit 20 of FIG. 2, through a bonding pad. This fourth programming state is further referred to as the "BUS STATE".

Figure 4C:
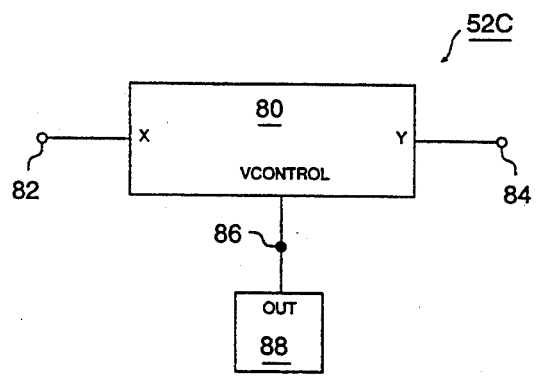

FIG. 4c shows a block diagram of a third embodiment of programmable I/O circuit 52 of FIG. 3, here referred to with label 52C. Programmable I/O circuit 52C of FIG. 4c includes a controllable I/O circuit 80 having a terminal X connected to a node 82, and having a terminal Y connected to a node 84. Terminals X and Y of controllable I/O circuit 80 of FIG. 4c correspond to terminals X and Y of programmable I/O circuit 52 of FIG. 3.

Terminal X of controllable I/O circuit 80 of FIG. 4c is intended for connection to a conductive lead that is connected to a bonding pad, and terminal Y of controllable I/O circuit 80 is intended for connection to a conductive lead that is not connected to a bonding pad.

Controllable I/O circuit 80 also includes a control input VCONTROL connected to control node 86 that is connected to a programmable element 88. Programmable element 88 can individually be programmed by the user to have either a high or a low logic level at its output. Programmable I/O circuit 52C has two programming states:

Controllable I/O circuit 80 is configured to drive node 82 with an enhancement of the signal appearing on node 84 when its control voltage input appearing on control node 86 is set to a first logic level. This programming state is the "OUTPUT STATE". As was the case for the "OUTPUT STATE" of programmable I/O circuit 52A of FIG. 4a, the signal enhancement is intended for the purpose of driving a conductive lead of the substrate.

Now referring to FIG. 4c again, controllable I/O circuit 80 is configured to propagate signals appearing on node 82 to node 84 when control node 86 is set to a second logic level. This programming state is the "INPUT STATE".

Figure 5A:
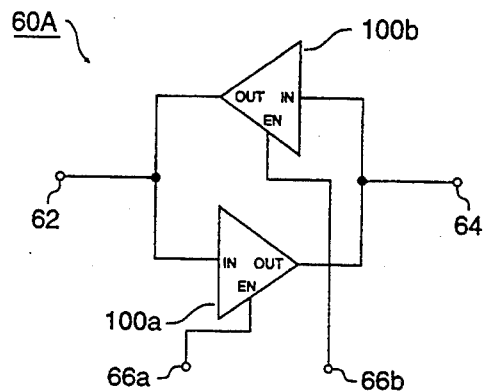
Figure 5B:
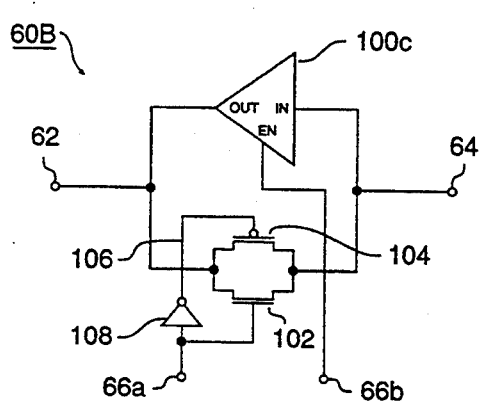
Figure 5C:
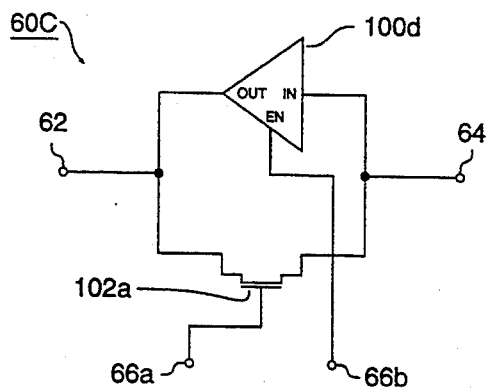

FIGS. 5a through 5c show embodiments of controllable I/O circuit 60. The same reference labels are used in FIGS. 4a, 5a, 5b and 5c for like elements.

FIG. 5a shows a first embodiment of controllable I/O circuit 60 of FIG. 4a, here referred to with label 60A. As one may see in FIG. 5a, controllable I/O circuit 60A includes two three-state buffers 100a and 100b. Three-state buffer 100a has its input ("IN") connected to node 62, its output ("OUT") connected to node 64, and its enable ("EN") connected to control node 66a. Three-state buffer 100b has its input connected to node 64, its output connected to node 62, and its enable connected to control node 66b. Three-state buffers 100a and 100b drive their output with an enhancement of the signal appearing on their input when a high logic level appears on their enable, and do not drive their output (the output is in its so-called "high-impedance" state), when a low logic level appears on their enable.

Consequently, when low logic levels are present on both control nodes 66a and 66b, both three-state buffers 100a and 100b are set to be not driving. This is the earlier defined "DISCONNECT STATE".

When a low logic level is present on control node 66a and a high logic level is present on control node 66b, three-state buffer 100b is set to be driving while three-state buffer 100a is set to be not driving. This is the earlier defined "OUTPUT STATE".

When a high logic level is present on control node 66a and a low logic level is present on control node 66b, three-state buffer 100b is set to be not driving while three-state buffer 100a is set to be driving. This is the earlier defined "INPUT STATE".

The combination of high logic levels on both control nodes 66a and 66b, that sets three-state buffers 100b and 100a both to be driving, is not used.

FIG. 5b shows a second and currently preferred embodiment of controllable I/O circuit 60 of FIG. 4a, here referred to with label 60B, including a three-state buffer 100c, an NMOS pass transistor 102, a PMOS pass transistor 104, and an inverter 108. Three-state buffer 100c has its input connected to node 64, its output connected to node 62, and its enable connected to control node 66b. NMOS pass transistor 102 has its source and drain connected to nodes 62 and 64. The gate of NMOS pass transistor 102 is connected to control node 66a. PMOS pass transistor 104 has its source and drain connected to nodes 62 and 64. The gate of PMOS pass transistor 104 is connected to a conductive lead 106, which is connected to the output of inverter 108. The input of inverter 108 is connected to control node 66a. When a low logic level is present on control node 66a, a high logic level is present on conductive lead 106 connected to the gate of PMOS pass transistor 104, such that, both NMOS pass transistor 102 and PMOS pass transistor 104 are turned off. When a high logic level is present on control node 66a, a low logic level is present on conductive lead 106 connected to the gate of PMOS pass transistor 104, such that both NMOS pass transistor 102 and PMOS pass transistor 104 are turned on.

Consequently, when low logic levels are present on both control nodes 66a and 66b, three-state buffer 100c is set to be not driving and both NMOS pass transistor 102 and PMOS pass transistor 104 are turned off. This is the earlier defined "DISCONNECT STATE".

When a low logic level is present on control node 66a and a high logic level is present on control node 66b, three-state buffer 100c is set to be driving and both NMOS pass transistor 102 and PMOS pass transistor 104 are turned off. This is the earlier defined "OUTPUT STATE".

When a high logic level is present on control node 66a and a low logic level is present on control node 66b, three-state buffer 100c is set to be not driving and both NMOS pass transistor 102 and PMOS pass transistor 104 are turned on. This is the earlier defined "INPUT STATE".

The combination of high logic levels on both control nodes 66a and 66b, that sets three-state buffer 100c to be driving and both NMOS pass transistor 102 and PMOS pass transistor 104 to be turned on, is not used.

FIG. 5c shows a third embodiment of controllable I/O circuit 60 of FIG. 4a, here referred to with label 60C, including a three-state buffer 100d, and an NMOS pass transistor 102a. Three-state buffer 100d has its input connected to node 64, its output connected to node 62, and its enable connected to control node 66b. NMOS pass transistor 102a has its source and drain connected to nodes 62 and 64, and its gate is connected to control node 66a.

Consequently, when low logic levels are present on both control nodes 66a and 66b, three-state buffer 100d is set to be not driving and NMOS pass transistor 102a is turned off. This is the earlier defined "DISCONNECT STATE".

When a low logic level is present on control node 66a and a high logic level is present on control node 66b, three-state buffer 100d is set to be driving and NMOS pass transistor 102a is turned off. This is the earlier defined "OUTPUT STATE".

When a high logic level is present on control node 66a and a low logic level is present on control node 66b, three-state buffer 100d is set to be not driving and NMOS pass transistor 102a is turned on. This is the earlier defined "INPUT STATE".

The combination of high logic levels on both control nodes 66a and 66b, that sets three-state buffer 100d to be driving and NMOS pass transistor 102a to be turned on, is not used.

Still referring to FIG. 5c, it is clear to those of ordinary skill in the art, that for correct operation, the high logic level provided on node 66a in order to turn NMOS pass transistor 102a on, must exceed the high signal level on nodes 62 and 64 by at least the threshold voltage of NMOS pass transistor 102a, thus still providing a conducting channel, in NMOS pass transistor 102a when a high signal level must be conducted from one of nodes 62 or 64 to the other.

Figure 5D:
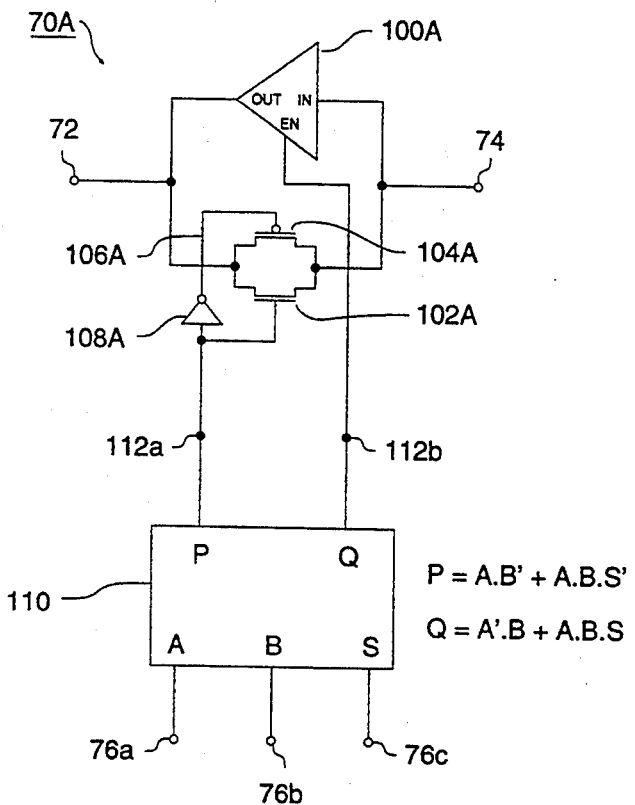
FIG. 5d shows an embodiment of the controllable I/O circuit of the programmable bidirectional I/O buffering circuit in FIG. 4b.

FIG. 5d shows a preferred embodiment of controllable I/O circuit 70 of FIG. 4b, here referred to with label 70A. The same reference labels are used in FIGS. 4b and 5d for like elements. Controllable I/O circuit 70A of FIG. 5d includes a three-state buffer 100A, an NMOS pass transistor 102A, a PMOS pass transistor 104A, an inverter 108A, and a; combinatorial logic block 110. Three-state buffer 100A has its input connected to node 74, its output connected to node 72, and its enable connected to a node 112b. NMOS pass transistor 102A has its source and drain connected to nodes 72 and 74. The gate of NMOS pass transistor 102A is connected to a node 112a. PMOS pass transistor 104A has its source and drain connected to nodes 72 and 74. The gate of PMOS pass transistor 104A is connected to a conductive lead 106A, which is connected to the output of inverter 108A. The input of inverter 108A is connected to node 112a.

Nodes 112a and 112b are connected to the outputs P and Q of combinatorial logic block 110. Combinatorial logic block 110 has inputs A and B connected to control nodes 76a and 76b, and input S connected to control node 76c. The, logic functions implemented by combinatorial logic block 110 are:

$$P = A \cdot B' + A \cdot B \cdot S' \qquad \text{Eq. 1}$$

and:

$$Q = A' \cdot B + A \cdot B \cdot S \qquad \text{Eq. 2}$$

The truth table implemented by combinatorial logic block 110 is:

| INPUTS | | | OUTPUTS | |
| --- | --- | --- | --- | --- |
| A | B | S | P | Q |
| L | L | L | L | L |
| L | L | H | L | L |
| L | H | L | L | H |
| L | H | H | L | H |
| H | L | L | H | L |
| H | L | H | H | L |
| H | H | L | H | L |
| H | H | H | L | H | where "L" is used to refer to a low logic level and "H" is used to refer to a high logic level.

Consequently, when low levels are present on both control nodes 76a and 76b, low levels must be present on nodes 112a and 112b, irrespective of the level present on control node 76c. It is clear that under these conditions three-state buffer 100A is set to be not driving while both NMOS pass transistor 102A and PMOS pass transistor 104A are turned off. This is the earlier defined "DISCONNECT STATE".

When a low level is present on control node 76a and a high level is present on control node 76b, a low level is present on node 112a and a high level is present on node 112b, irrespective of the level present on control node 76c. It is clear that under these conditions three-state buffer 100A is set to be driving while both NMOS pass transistor 102A and PMOS pass transistor 104A are turned off. This is the earlier defined "OUTPUT STATE".

When a high level is present on control node 76a and a low level is present on control node 76b, a high level is present on node 112a and a low level is present on node 112b, irrespective of the level present on control node 76c. It is clear that under these conditions three-state buffer 100A is set to be not driving while both NMOS pass transistor 102A and PMOS pass transistor 104A are turned on. This is the earlier defined "INPUT STATE".

When high levels are present on both control nodes 76a and 76b, the levels appearing on nodes 112a and 112b depend on the level present on control node 76c. When a low level is present, on control node 76c, a high level is present on node 112a and a low level is present on node 112b. Hence, three-state buffer 100A is set to be not driving while both NMOS pass transistor 102A and PMOS pass transistor 104A are turned on. When a high level is present on control node 76c, a low level is present on node 112a and a high level is present on node 112b. Hence, three-state buffer 100A is set to be driving while both NMOS pass transistor 102A and PMOS pass transistor 104A are turned off. This programming state is the earlier defined "BUS STATE".

Figure 5E:
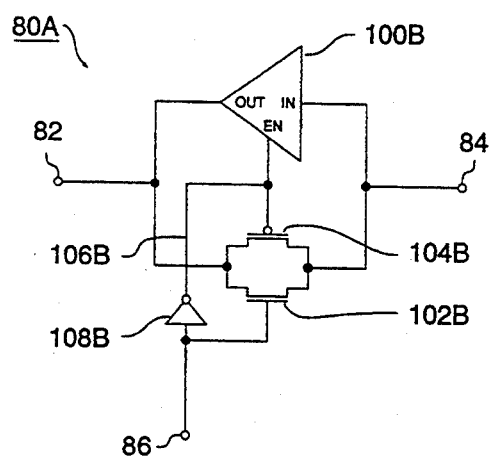
FIG. 5e shows an embodiment of the controllable I/O circuit of the programmable bidirectional I/O buffering circuit in FIG. 4c.

FIG. 5e shows a preferred embodiment of controllable I/O circuit 80 of FIG. 5e, here referred to with label 80A. The same reference labels are used in FIGS. 4c and 5e for like elements. Controllable I/O circuit 80A of FIG. 5e includes a three-state buffer 100B, an NMOS pass transistor 102B, a PMOS pass transistor 104B, and an inverter 108B. Three-state buffer 100B has its input connected to node 84, its output connected to node 82, and its enable connected to a conductive lead 106B. Conductive lead 106B is connected to the output of inverter 108B. The input of inverter 108B is connected to control node 86.

NMOS pass transistor 102B has its source and drain connected to nodes 82 and 84. The gate of NMOS pass transistor 102B is connected to control node 86. PMOS pass transistor 104B has its source and drain connected to nodes 82 and 84. The gate of PMOS pass transistor 104B is connected to a conductive lead 106B, which is connected to the output of inverter 108B.

It is clear that when a low logic level is present on node 86, three-state buffer 100B is set to be driving while both NMOS pass transistor 102B and PMOS pass transistor 104B are turned off. This is the earlier defined "OUTPUT STATE". When a high logic level is present on node 86, three-state buffer 100B is set to be not driving while both NMOS pass transistor 102B and PMOS pass transistor 104B are turned on. This is the earlier defined "INPUT STATE".

Figure 6A:
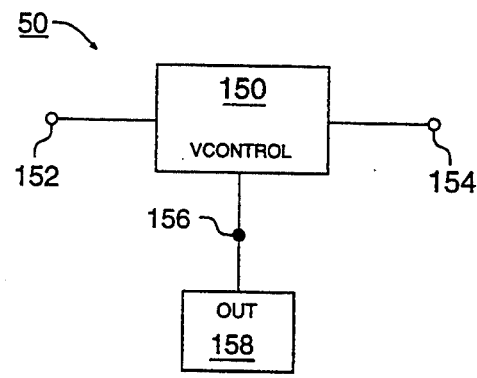
FIG. 6a shows an embodiment of the programmable junction in FIG. 3.

Now turning to FIG. 6a, a block diagram of a programmable junction 50 is shown, including a switch 150, connected to nodes 152 and 154, and connected to a control node 156. Switch 150 is configured to bidirectionally connect nodes 152 and 154 when control node 156 is set to a first logic level. This programming state is referred to as the "CONDUCTING STATE". Switch 150 is configured to provide a very high impedance between nodes 152 and 154 when control node 156 is set to a second logic level. This programming state is referred to as the "NON-CONDUCTING STATE". Programmable element 158 is connected to control node 156, and can individually be programmed by the user to have either a high or a low logic level at its output.

Figure 6B:
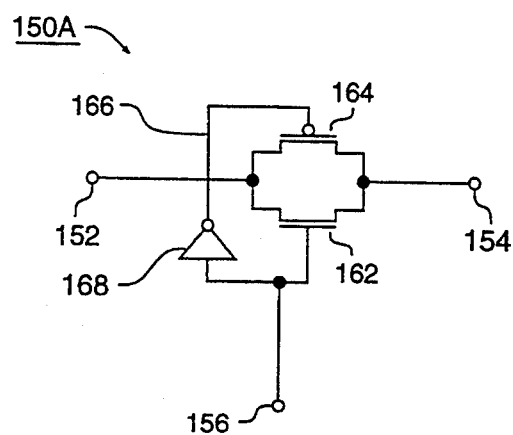
Figure 6C:
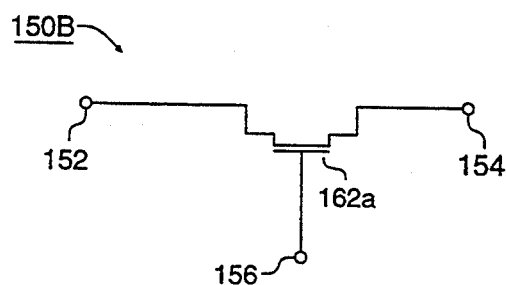

FIGS. 6b and 6c show embodiments of switch 150. The same reference labels are used in FIGS. 6a through 6c for like elements.

FIG. 6b shows a first embodiment of switch 150, here referred to with label 150A. Switch 150A includes an NMOS pass transistor 162, with its source and drain connected to nodes 152 and 154, while its gate is connected to control node 156. A PMOS pass transistor 164 has its source and drain connected to nodes 152 and 154, while its gate is connected to conductive lead 166. Conductive lead 166 is connected to the output of an inverter 168. The input of inverter 168 is connected to control node 156.

It is clear that NMOS pass transistor 162 and PMOS pass transistor 164 are both turned on when a high logic level is present on control node 156. This is the "CONDUCTING STATE". NMOS pass transistor 162 and PMOS pass transistor 164 are both turned off when a low logic level is present on control node 156. This is the "NON-CONDUCTING STATE".

FIG. 6c shows a second and currently preferred embodiment of switch 150, here referred to with label 150B. Switch 150B consists of an NMOS pass transistor 162a, with its source and drain connected to nodes 152 and 154, while its gate is connected to control node 156. NMOS pass transistor 162a is turned on when a high logic level is present on control node 156. This is the "CONDUCTING STATE". NMOS pass transistor 162a is turned off when a low logic level is present on control node 156. This is the "NON-CONDUCTING STATE".

Still referring to FIG. 6c, it will be clear to those of ordinary skill in the art, that for correct operation the high logic level provided on node 156 in order to turn NMOS pass transistor 162a on, must exceed the high signal level on nodes 152 and 154 by at least the threshold voltage of NMOS pass transistor 162a, thus still providing a conducting channel in NMOS pass transistor 162a when a high signal level must be conducted from one of nodes 152 or 154 to the other.

OPERATION

Now referring again to FIG. 3, it is clear from the above explanations that, by programming the appropriate ones of programmable I/O circuits 52 and programmable junctions 50, signal propagating paths may be established between pairs of terminals of A1-A4, B1-B4, ..., H1-H4 if these terminals have intersecting wiring channels and if a programmable junction is present at the intersection.

Figure 7A:
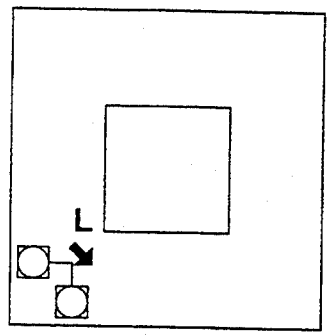
FIG. 7a and 7b show the symbols for interconnections among bonding pads of the peripheral switch network in FIG. 2, obtained by programming the programmable I/O circuits and the programmable junctions in FIG. 3.

Signal propagating paths of a first type, further referred to as "L-type connections", may be obtained between pairs of terminals situated at the respective edges that form the outer corners of peripheral switch network 38, more specifically: between one of terminals A1-A4 and one of terminals B1-B4, between one of terminals C1-C4 and one of terminals D1-D4, between one of terminals E1-E4 and one of terminals F1-F4, and between one of terminals G1-G4 and one of terminals H1-H4. It is important to notice that these "L-type connections" may be obtained using exactly one programmable junction 50 in the signal path. From FIG. 2 it is clear that these signal propagating paths also connect the respective ones of bonding pads 24a-24z and 24a'-24f' attached to terminals A1-A4, B1-B4, ..., H1-H4. For clarity in the future explanations, we have represented an "L-type connection" by the symbol shown in FIG. 7a.

Figure 7B:
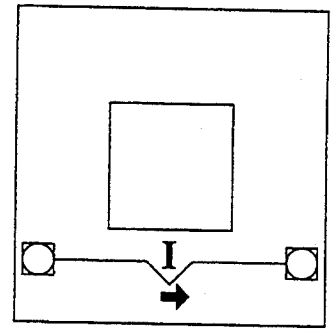

Now referring again to FIG. 3, signal propagating paths of a second type, further referred to as "I-type connections", may be obtained between pairs of terminals situated at opposite edges of peripheral switch network 38, more specifically: between one of terminals A1-A4 and one of terminals D1-D4, between one of terminals C1-C4 and one of terminals F1-F4, between one of terminals E1-E4 and one of terminals H1-H4, between one of terminals G1-G4 and one of terminals B1B4. These "I-type connections" may be obtained using exactly one programmable junction 50 in the signal path. From FIG. 2 it is clear that these signal propagating paths also connect the respective ones of bonding pads 24a-24z and 24a'-24f' attached to terminals A1-A4, B1-B4, ..., H1-H4. For clarity in the future explanations, we have represented an "I-type connection" by the symbol shown irk FIG. 7b.

Now referring again to FIG. 3, it is further clear from the above explanations that, by programming the appropriate ones of programmable I/O circuits 52 and programmable junctions 50, signal propagating paths may be established between terminals A1-A4, B1-B4, ..., H1-H4 and connection nodes a1-a2, b1-b2, ..., h1-h2, more specifically: between one of terminals A1-A4 and one of connection nodes b1-b2, between one of terminals B1-B4 and one of connection nodes a1-a2, between one of terminals C1-C4 and one of connection nodes d1–d2, between one of terminals D1–D4 and one of connection nodes c1–c2, between one of terminals E1–E4 and one of connection nodes f1–f2, between one of terminals F1–F4 and one of connection nodes e1–e2, between one of terminals G1–G4 and one of connection nodes h1–h2, and between once of terminals H1–H4 and one of connection nodes g1–g2. This type of signal propagating paths will be referred to in the future as "C-type connections". It is important to notice that these "C-type connections" may be obtained using at most one programmable junction 50 in the signal path.

Figure 7C:
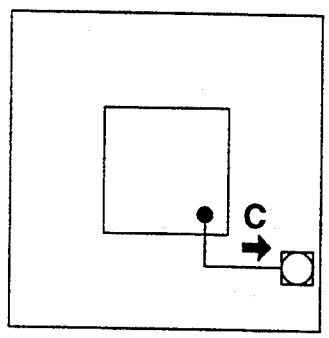
FIG. 7c and 7d show the symbols for interconnections between bonding pads of the peripheral switch network in FIG. 2 and connection nodes of the main circuitry in FIG. 2, obtained by programming the programmable bidirectional I/O buffering circuits and the programmable junctions in FIG. 3.
Figure 7D:
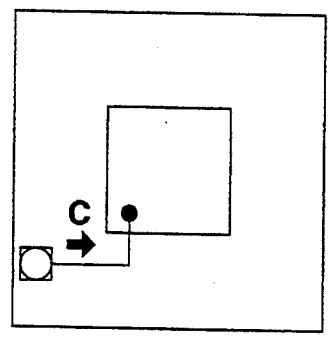

It is further clear that programmable I/O circuits 52 and programmable junctions 50 may be programmed such that these "C-type connections" either propagate signals from one of connection nodes a1-a2, b1-b1, ..., h1-h2 to one of terminals A1-A4, B1-B4, ..., H1-H4; or in the reverse direction. In the future, we will refer to a "C-type connection" that propagates signals from one of connection nodes a1-a2, b1-b1, ..., h1-h2 to one of terminals A1-A4, B1-B4, ..., H1-H4 as a "C-type output"; we will refer to a "C-type connection" that propagates signals from one of terminals A1-A4, B1-B4, ..., H1-H4 to one of connection nodes a1-a2, b1-b1, h1-h2 as a "C-type input", From FIG. 2 it is clear that these signal propagating paths also provide connections between the respective ones of bonding pads 24a–24z and 24a'–24f' attached to terminals A1-A4, B1-B4, ..., H1-H4 and connection nodes a1-a2, b1-b1, ..., h1-h2. For clarity in the future explanations, we have represented a "C-type output" by the symbol shown in FIG. 7c, and a "C-type input" by the symbol shown in FIG. 7d.

Figure 7E:
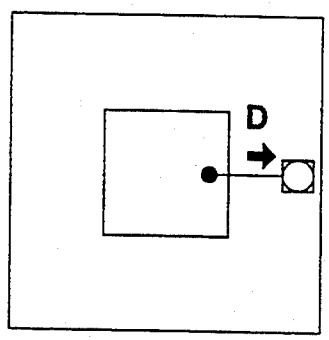
FIG. 7e and 7f show the symbols for interconnections between bonding pads of the integrated circuit in FIG. 2 and terminals of the main circuitry in FIG. 2, available depending on the configuration of the main circuitry of the integrated circuit in FIG. 2.
Figure 7F:
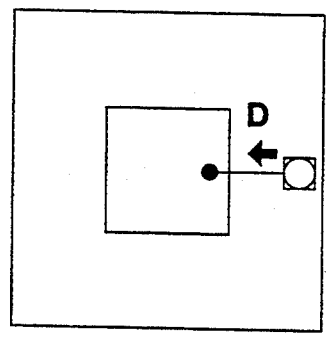

Now referring to FIG. 2, it is further clear from the above explanations that depending on the configuration of main circuitry 36, direct connection exist between terminals 42A–42D of main circuitry 36 and bonding pads 24A–24D of integrated circuit 20. This type of signal propagating paths will be referred to in the future as a "D-type connection". If the bonding pad 24A–24D is used as an output of integrated circuit 20, it is referred to as a "D-type output". If the bonding pad 24A–24D is used as an input of integrated circuit 20, it is referred to as a "D-type input". The direction in which these "D-type connections" propagate signals depends on the particular design of the circuits of main circuitry 36, and may be fixed or programmable, depending on the needs of the application. For clarity in the future explanations, we have represented a "D-type output" by the symbol shown in FIG. 7e, and a "D-type input" by the symbol shown in FIG. 7f.

Referring now again to FIG. 2, it is clear that by appropriately programming the programmable junctions and the programmable I/O circuits of peripheral switch network 38 as explained before, a wide variety of fast signal propagating paths may be obtained between bonding pads 24 of peripheral switch network 38 and connection nodes 48 of main circuitry 36; and among bonding pads 24 of peripheral switch network 38.

Referring now to FIG. 1 and FIG. 2, it is clear that by appropriately programming the programmable junctions and the programmable I/O circuits of peripheral switch network 38 (in FIG. 2) as explained before, and due to fixed conductive leads 34 and 32 present on substrate 22 (in FIG. 1), a wide variety of fast signal propagating paths may be achieved between connection nodes 40a–40p, 42a–42d (in FIG. 2) of the main circuitry 36 (in FIG. 2) of different integrated circuits 20a–20f (in FIG. 1), or between connection nodes 40a–40p (in FIG. 2) of the main circuitry 36 (in FIG. 2) and external contacts 30 (in FIG. 1).

FIGS. 8a through 8j show illustrative examples of interconnections that may be achieved by using the embodiments presented above. For clarity, elements such as component contacts 26, bonding wires 28 and substrate 22 of FIG. 1 have been omitted. Furthermore, the symbols presented in FIGS. 7a–7f are used in FIGS. 8a through 8l to represent the circuits of the peripheral switch network 38 of FIG. 3, programmed to the interconnection mode corresponding to the symbol. The same reference labels have: been used in FIGS. 8a through 8j for like elements.

Figure 8A:
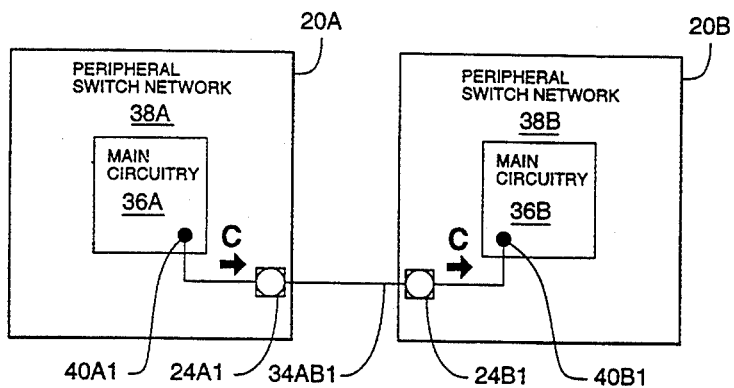
FIG. 8a through 8j show examples of interconnections obtained in a multi-chip system as the one of FIG. 1 with integrated circuits as in FIG. 2, using the symbols presented in FIG. 7a through 7f.

FIG. 8a shows an interconnection from a connection node 40A1 of main circuitry 36A of an integrated circuit 20A to a connection node 40B1 of main circuitry 36B of an integrated circuit 20B. As shown by the symbol, peripheral switch network 38A of integrated circuit 20A is programmed to a "C-type output" from connection node 40A1 to a bonding pad 24A1. Bonding pad 24A1 is connected to a conductive lead 34AB1 of the substrate, which is connected to a bonding pad 24B1 of integrated circuit 20B. Switch network 38B of integrated circuit 20B is programmed to a "C-type input" from bonding pad 24B1 to connection node 40B1.

Figure 8B:
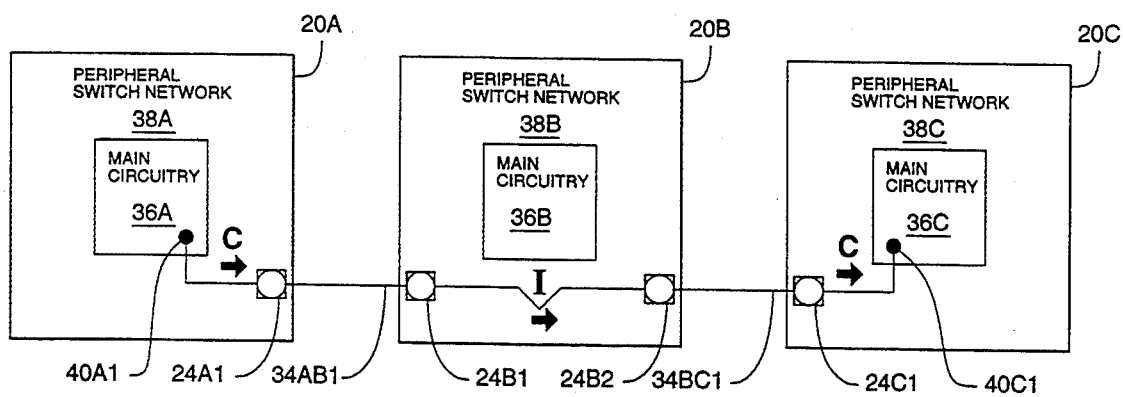

FIG. 8b shows an interconnection from connection node 40A1 of main circuitry 36A of integrated circuit 20A to a connection node 40C1 of main circuitry 36C of an integrated circuit 20C. As shown by the symbol, peripheral switch network 38A of integrated circuit 20A is programmed to a "C-type output" from connection node 40A1 to bonding pad 24A1. Bonding pad 24A1 is connected to conductive lead 34AB1 of the substrate, which is connected to bonding pad 24B 1 of integrated circuit 20B. Switch network 38B of integrated circuit 20B is programmed to an "I-type connection" from bonding pad 24B1 to a bonding pad 24B2. Bonding pad 24B2 is connected to a conductive lead 34BC1 of the substrate, which is connected to a bonding pad 24C1 of peripheral switch network 38C of integrated circuit 20C. Switch network 38C of integrated circuit 20C is programmed to a "C-type input" from bonding pad 24C1 to connection node 40C1.

Figure 8C:
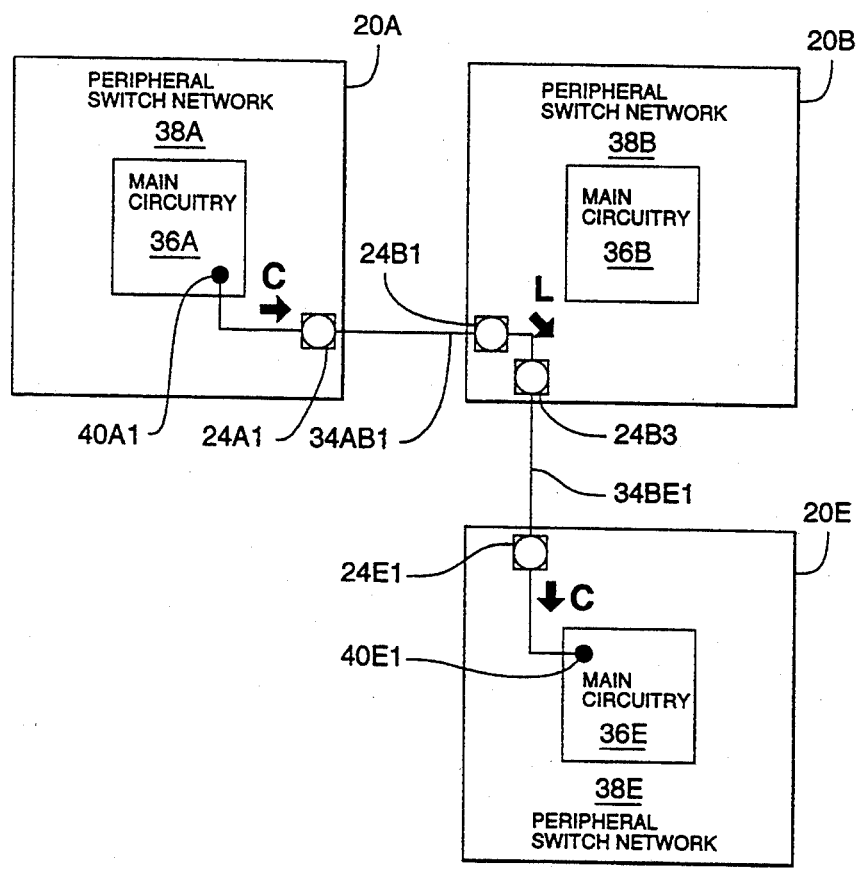

FIG. 8c shows an interconnection from connection node 40A1 of main circuitry 36A of integrated circuit 20A to a connection node 40E1 of main circuitry 36E of an integrated circuit 20E. As shown by the symbol, peripheral switch network 38A of integrated circuit 20A is programmed to a "C-type output" from connection node 40A1 to bonding pad 24A1. Bonding pad 24A1 is connected to conductive lead 34AB1 of the substrate, which is connected to bonding pad 24B1 of integrated circuit 20B. Switch network 38B of integrated circuit 20B is programmed to an "L-type connection" from bonding pad 24B1 to a bonding pad 24B3. Bonding pad 24B3 is connected to a conductive lead 34BE1 of the substrate, which is connected to a bonding pad 24E1 of peripheral switch network 38E of integrated circuit 20E. Switch network 38E of integrated circuit 20E is programmed to a "C-type input" from bonding pad 24E1 to connection node 40E1.

Figure 8D:
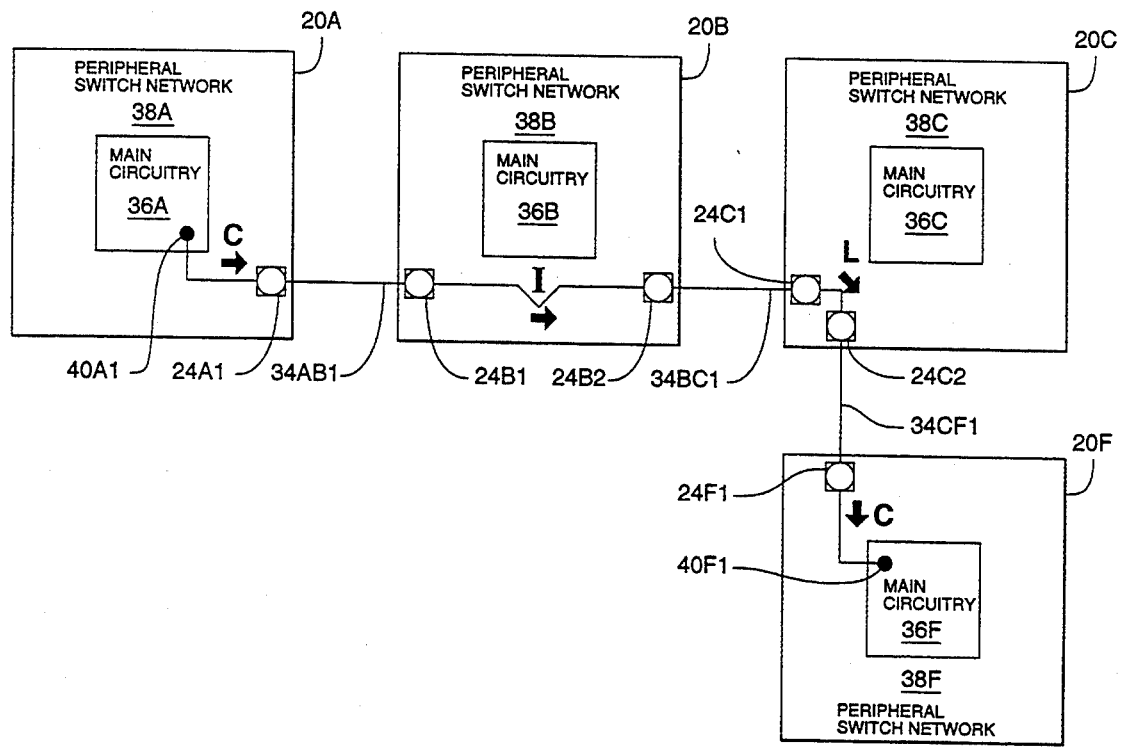

FIG. 8d shows an interconnection from connection node 40A1 of main circuitry 36A of integrated circuit 20A to a connection node 40F1 of main circuitry 36F of an integrated circuit 20F. As shown by the symbol, peripheral switch network 38A of integrated circuit 20A is programmed to a "C-type output" from connection node 40A1 to bonding pad 24A1. Bonding pad 24A1 is connected to conductive lead 34AB1 of the substrate, which is connected to bonding pad 24B1 of integrated circuit 20B. Switch network 38B of integrated circuit 20B is programmed to an "I-type connection" from bonding pad 24B1 to bonding pad 24B2. Bonding pad 24B2 is connected to conductive lead 34BC1 of the substrate, which is connected to bonding pad 24C1 of peripheral switch network 38C of integrated circuit 20C. Switch network 38C of integrated circuit 20C is programmed to an "L-type connection" from bonding pad 24C1 to a bonding pad 24C2. Bonding pad 24C2 is connected to a conductive lead 34CF1 of the substrate, which is connected to a bonding pad 24F1 of peripheral switch network 38F of integrated circuit 20F. Switch network 38F of integrated circuit 20F is programmed to a "C-type input" from bonding pad 24F1 to connection node 40F1.

It is clear to those of ordinary skill in the art that interconnections between two connection nodes of the main circuitry of different integrated circuits may be achieved using first a "C-type output", followed by a series of throughchip interconnections containing a plurality of "I-type connections" and "L-type connections," and terminated using a "C-type input".

Figure 8E:
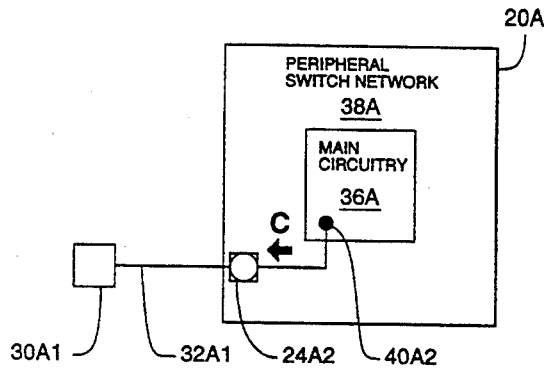

FIG. 8e shows an interconnection from a connection node 40A2 of main circuitry 36A of integrated circuit 20A to an external contact 30A1 of the substrate. As shown by the symbol, peripheral switch network 38A of integrated circuit 20A is programmed to a "C-type output" from connection node 40A2 to a bonding pad 24A2. Bonding pad 24A2 is connected to a conductive lead 32A1 of the substrate, which is connected to external contact 30A1.

Figure 8F:
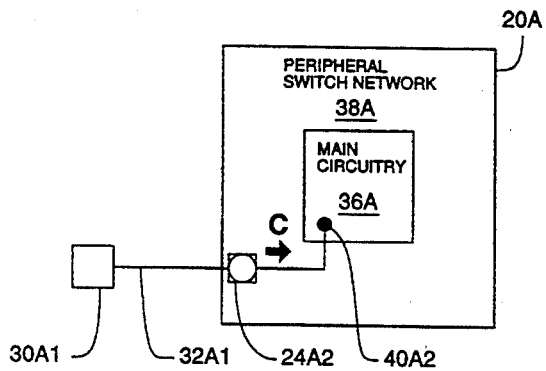

FIG. 8f shows an interconnection from external contact 30A1 of the substrate to connection node 49A2 of main circuitry 36A of integrated circuit 20A External contact 30A1 is connected to conductive lead 32A1 of the substrate, which is connected to bonding pad 24A2 of peripheral switch circuit 38A of integrated circuit 20A. As shown by the symbol, peripheral switch network 38A of integrated circuit 20A is programmed to a "C-type input" from bonding pad 24A2 to connection node 40A2 of main circuitry 36A of integrated circuit 20A.

Figure 8G:
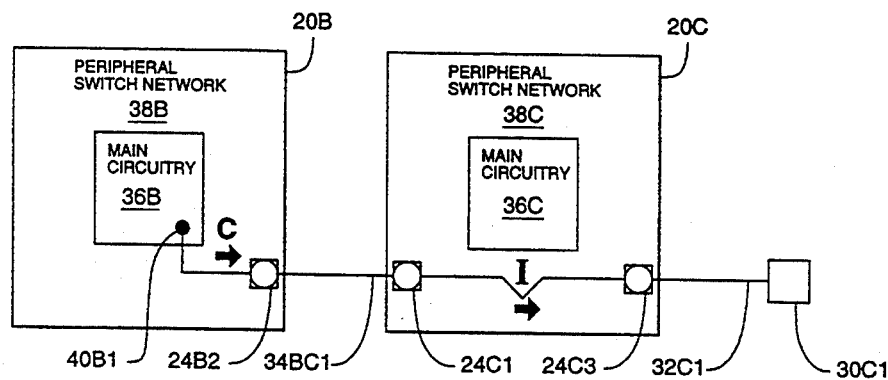

FIG. 8g shows an interconnection from a connection node 40B1 of main circuitry 36B of integrated circuit 20B to an external contact 30C1 of the substrate. As shown by the symbol, peripheral switch network 38B of integrated circuit 20B is programmed to a "C-type output" from connection node 40B1 to bonding pad 24B2. Bonding pad 24B2 is connected to conductive lead 34BC1 of the substrate, which is connected to bonding pad 24C1 of peripheral switch network 38C of integrated circuit 20C. Peripheral switch network 38C of integrated circuit 20C is programmed to an "I-type connection" from bonding pad 24C1 to a bonding pad 24C3. Bonding pad 24C3 is connected to a conductive lead 32C1 of the substrate, which is connected to external contact 30C1.

It is clear that interconnections from a connection node of the main circuitry of an integrated circuit to an external contact of the substrate may be achieved using first a "C-type output", followed by a series of throughchip connections containing a plurality of "I-type connections" and "L-type connections", leading to an external contact; and conversely.

Figure 8H:
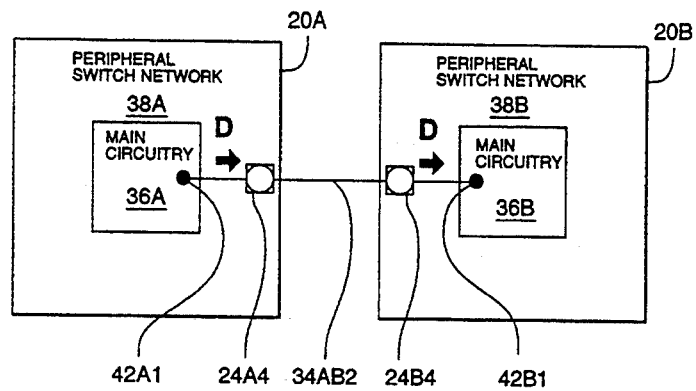

FIG. 8h shows an interconnection from a connection node 42A1 of main circuitry 36A of integrated circuit 20A to a connection node 42B1 of main circuitry 36B of integrated circuit 20B. As shown by the symbol, main circuitry 36A of integrated circuit 20A is configured to have a "D-type output" from connection node 42A1 to a bonding pad 24A4. Bonding pad 24A4 is connected to a conductive lead 34AB2 of the substrate, which is connected to a bonding pad 24B4 of peripheral switch network 38B of integrated circuit 20B. Main circuitry 36B of integrated circuit 20B is configured to have to a "D-type input" from bonding pad 24B4 to connection node 42B 1.

Figure 8I:
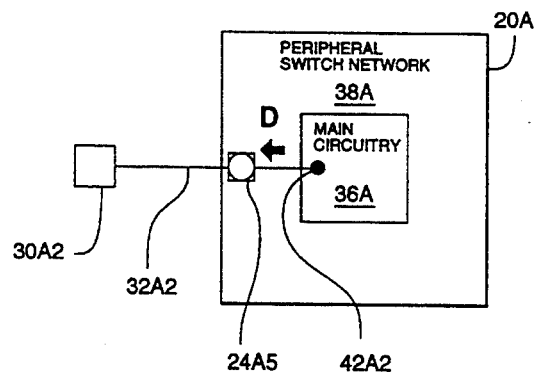

FIG. 8i shows an interconnection from connection node 42A2 of main circuitry 36A of integrated circuit 20A to an external contact 30A2 of the substrate. As shown by the symbol, main circuitry 36A of integrated circuit 20A is configured to have a "D-type output" from connection node 42A2 to a bonding pad 24A5. Bonding pad 24A5 is connected to a conductive lead 32A2 of the substrate, which is connected to external contact 30A2.

Figure 8J:
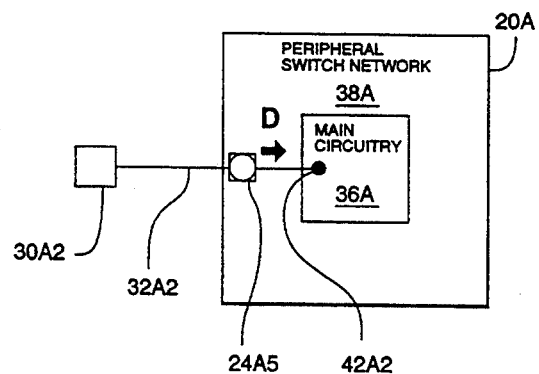

FIG. 8j shows an interconnection from external contact 30A2 of the substrate to connection node 42A2 of main circuitry 36A of integrated circuit 20A. External contact 30A2 is connected to conductive lead 32A2 of the substrate, which is connected to bonding pad 24A5 of peripheral switch circuit 38A of integrated circuit 20A. As shown by the symbol, main circuitry 36A of integrated circuit 20A is configured to have a "D-type input" from bonding pad 24A5 to connection node 42A2.

It is also clear that interconnections between more than two connection nodes of main circuitry may be achieved by allowing more than one programmable junction per conductive lead to be in the "CONDUCTING STATE", in peripheral switch network 38 of FIG. 3.

Also, many other types of signal propagating paths, that have not been discussed here, may be obtained by programming the peripheral switch network. These paths may not achieve the same high performance as the ones represented by FIGS. 7a through 7f, but they add to the flexibility of the interconnect architecture. These paths may be used for non-critical paths.

Buses may be implemented using the circuits described in FIGS. 4b and 5d.

We have indications that when using embodiments such as the ones depicted in FIGS. 1 through 3, and when achieving interconnections as explained above, it is advantageous for performance that the embodiments of FIGS. 5b, 5c, 5d or 5e are used for the programmable I/O circuit. Our findings show that a lower signal propagation delay is obtained if instead of a three-state buffer, an NMOS pass transistor or a pair of NMOS and PMOS pass-transistors is used for propagating a signal from a bonding pad to an internal node. This finding also leads us to believe that the circuits depicted in FIGS. 5b, 5c, 5d and 5e have a merit for general useage in any type of integrated circuit as programmable bidirectional I/O buffering circuits.

We also have indications that when using substrates and bonding technologies with very low parasitic capacitances and inductances, such as multi-chip module substrates used with solder-bump bonding, the type of the wiring channel connected to a bonding pad, as defined above, may be optimally chosen with respect to the capacitance of the conductive lead of the substrate, connected to that bonding pad. In fact, we believe that the overall propagation delays are shortest when the conductive leads of the substrate that have the smallest wiring capacitance are connected to bonding pads attached to wiring channels of the second or third type, and when the conductive leads of the substrate that have the highest wiring capacitance are connected to bonding pads attached to wiring channels of the first type.

Thus, an "L-type connection" connecting two conductive leads of the substrate with low wiring capacitance may be implemented without programmable I/O circuits in its signal propagating path. This causes the propagation delay to be shorter than in the case Where all wiring channels would be of the first type. However, the signal rise and fall times are depending on the wiring capacitance of the conductive leads of the substrate that are in the interconnection. It is only in cases where the wiring capacitance of the conductive leads is small, that acceptable rise and fall times can be obtained without programmable I/O circuits in an "L-type connection".

An "L-type connection" connecting two conductive leads of the substrate with high wiring capacitance may be implemented using programmable I/O circuits in its signal propagating path. This ensures that the signal rise and fall times, which are depending on the wiring capacitance of the conductive leads of the substrate, do not become unacceptably large.

Figure 9A:
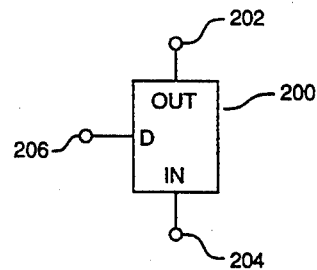
FIG. 9a shows an embodiment of a programmable memory element.

Programmable elements 68a–68b of FIG. 4a, 78a–78b of FIG. 4b, 88 of FIG. 4c, and 158 of FIG. 6a may be implemented using any programming technology, e.g. using SRAM or shift register cells, non-volatile memory elements, anti-fuses, etc. as known in the art. More specifically, FIG. 9a shows an embodiment of a programmable element 200 of :which the value may be changed during operation. The embodiment depicted here is known as a "latch". Programmable element 200 has an input IN connected to a node 204, an output OUT connected to a node 202, and a control input D connected to a node 206. Node 202 is intended for connection to the control nodes of the controllable I/O circuits, such as nodes 66a–66b in FIG. 4a, nodes 76a–76b in FIG. 4b, anode 86 in FIG. 4c, or for connection to the control nodes of switches, such as node 156 in FIG. 6a.

When a high level is present at control input D, the level at the output OUT of programmable element 200 is equal to the logic level appearing on the input IN. When the high level at control input D is changed to a low level, the logic level present at the input IN at that moment is stored in programmable element 200 and appears at the output OUT irrespective of subsequent changes of the level on input IN.

The signals on nodes 204 and 206 may originate in the main circuitry, in the peripheral interconnection frame, or in an external device through a bonding pad.

Figure 9B:
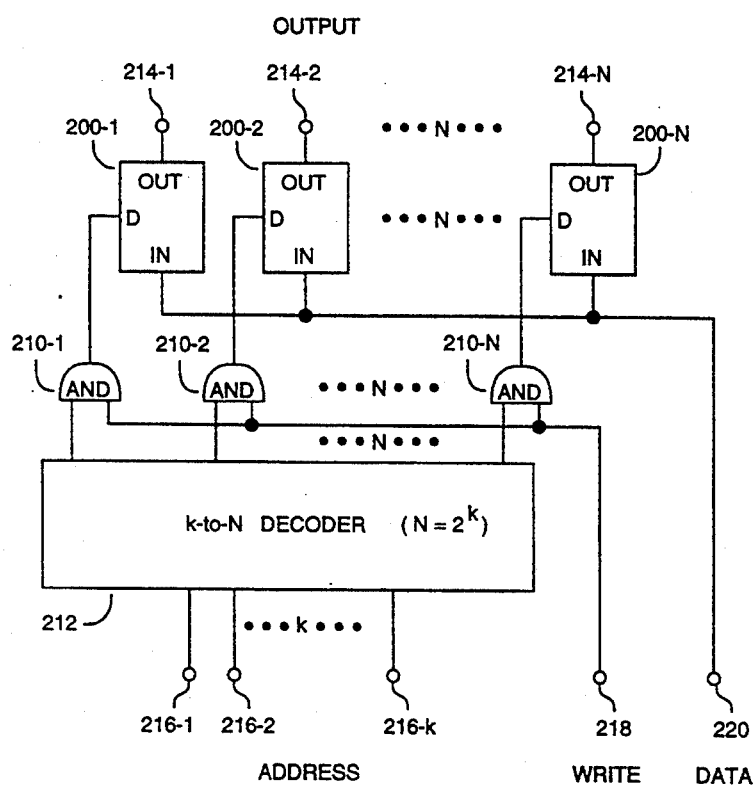
FIG. 9b shows an embodiment of a plurality of programmable memory elements of FIG. 9a and the circuitry used to reprogram them.

FIG. 9b shows an embodiment of N programmable elements 200-1 through 200-N and circuitry that allows selectively changing the stored values. For generality, an integer parameter "N" is used here to indicate the total number of programmable elements. The outputs OUT of programmable elements 200-1 through 200-N are connected to OUTPUT nodes 214-1 through 214-N. The inputs IN of programmable elements 200-1 through 200-N are connected to a DATA node 220. Control inputs D of programmable elements 200-1 through 200-N are connected to the N outputs of two-input AND gates 210-1 through 210-N. Two-input AND gates 210-1 through 210-N have a first one of their inputs connected to a WRITE node 218, and a second one of their inputs each connected to one of N outputs of a k-to-N decoder 212. For generality, an integer parameter "k" is used here to indicate the number of inputs to k-to-N decoder 212. It is clear that in k-to-N decoder 212, N should be equal to $2^k$. k-to-N decoder 212 has k inputs each connected to one of k ADDRESS nodes 216-1 through 216-k.

When a high level is present on WRITE node 218, one of the N programmable elements 200-1 through 200-N has a high level on its input D, corresponding to the combination of logic levels appearing on ADDRESS nodes 216-1 through 216-k. We refer to this programmable element as the "selected" one. Consequently, the logic level present on DATA node 220 will appear at the output OUT of the selected one of programmable elements of 200-1 through 200-N. When now WRITE node 218 goes low, the logic level currently present at DATA node 220 is stored into the selected programmable element, and appears on its output; OUT irrespective of a subsequent level change of DATA node 220.

It is clear to those of ordinary skill in the art how this embodiment may be used to program programmable elements 200-1 through 200-N.

This embodiment allows the user to make gradual changes in the inter-chip interconnection pattern during operation of the multi-chip system and the changes may be made dependent on the outcome of an application being executed on the multi-chip system.

Figure 10A:
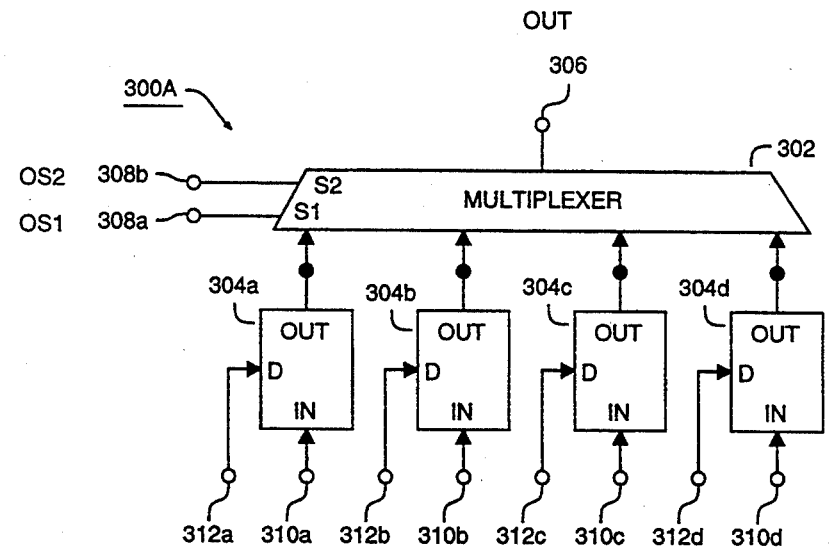
FIGS. 10a and 10b show embodiments of programmable memory elements that each have a plurality of settings.

FIG. 10a shows an embodiment of a programmable element, labeled 300A. Programmable element 300A contains 4 latches 304a through 304d. The outputs OUT of latches 304a–304d are each connected to one of the inputs of a 4-to-1 multiplexer 302. The output of multiplexer 302 is connected to a node 306, which is the output of programmable element 300A. The multiplexer 302 has two select inputs S1 and S2, connected to nodes 308a and 308b. The inputs IN of programmable elements 304a–304d are each connected to one of four input nodes 310a–310d. The control inputs D of programmable elements 304a–304d are each connected to one of four control nodes 312a–312d.

As is known to those of ordinary skill in the art, 4-to-1 multiplexer 302 is configured such that the logic level appearing at its output is the same as the logic level present on the input that corresponds to the combination of logic levels present on control inputs S1 and $2. As a result, by setting the logic levels of nodes 308a and 308b, the output OUT of any of latches 304a–304d, further referred to as the latch "that is selected for output", may be chosen to appear on node 306. The value stored in each of latches 304a–304d may be changed to the value present on input IN connected to nodes 310a–310d, by first applying a high level on its control input D connected to nodes 312a–312d and subsequently applying a low level on its control input D.

It is also clear that the value stored in the ones of latches 304a–304d that are not selected for output may be changed without changing the logic level appearing on node 306.

Node 306 is intended for connection to the control nodes of the controllable I/O circuits, such as nodes 66a–66b in FIG. 4a, nodes 76a–76b in FIG. 4b, node 86 in FIG. 4c, or for connection to the control nodes of switches, such as node 156 in FIG. 6a.

Consequently, programmable element 300A of FIG. 10a may be used in an embodiment of the present invention to provide four different interconnection patterns depending on the values of control nodes 308a and 308b. Furthermore, while one interconnection pattern is selected, the three other interconnection patterns may be changed by the user without interrupting the execution of an application on the multi-chip system. Some of latches 304a–304d may be implemented as non-volatile memory elements or read-only memory (ROM) elements.

Figure 10B:
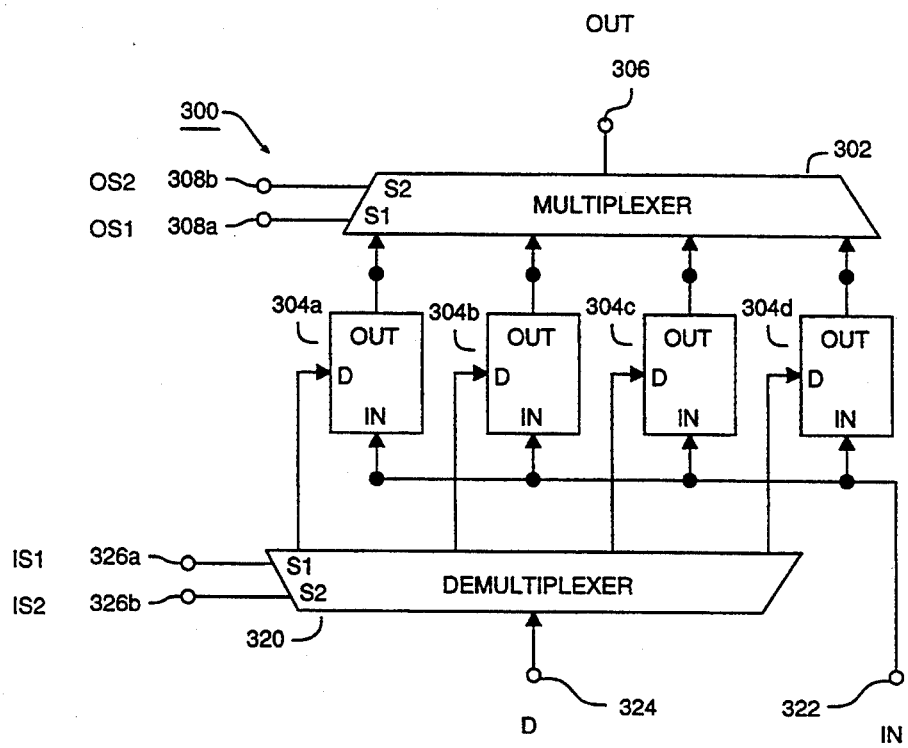

FIG. 10b shows another embodiment of a programmable element, be1ed 300. The same reference labels are used in FIGS. 10a and 10b for like elements. Programmable element 300 contains 4 latches 304a through 304d. The outputs OUT of latches 304a–304d are each connected to one of the inputs of a 4-to-1 multiplexer 302. The output of multiplexer 302 is connected to a node 306, which is further referred to as the output "OUT" of programmable element 300. The multiplexer 302 has two select inputs S1 and S2, connected to select nodes 308a and 308b, which are further referred to as the output-select inputs "OS1" and "OS2" of programmable element 300. The inputs IN of programmable elements 304a–304d are connected to a node 322, which is further referred to as the data input "IN" of programmable element 300. The control inputs D of programmable elements 304a–304d are each connected to one of four outputs of a 1-to-4 demultiplexer 320. The two selection inputs $1 and $2 of demultiplexer 306 are connected to nodes 326a and 326b, which are further referred to as input-select inputs "IS1" and "IS2" of programmable element 300.

The input of 1-to-4 demultiplexer 320 is connected to a node 324, which is further referred to as control input "D" of programmable element 300.

As is known to those of ordinary skill in the art, 1-to-4 demultiplexer 320 is configured such that the logic level present at its input also appears on one of its four outputs, corresponding to the output selected by the combination of logic levels present on nodes 326a and 326b. Also, 1-to-4 demultiplexer is configured to have a low logic level on its three non-selected outputs. As a result, the logic level present on node 324 also appears at the control input D of one of latches 304a–304d further referred to as the latch "that is selected for input", depending on the combination of logic levels present on nodes 326a and 326b. Thus, by setting the logic levels on nodes 326a and 326b, and by first applying a high level to node 324 and subsequently applying a low level to node 324, the value present on node 322 may be stored in the one of latches 304a–304b that is selected for input.

The operation of multiplexer 302 and of latches 304a–304d of FIG. 10b is similar to the operation of multiplexer 302 and latches 304a–304d of FIG. 10a.

Consequently, it is clear how one of latches 304a–304d may be selected for input through nodes 326a and 326b, and may be loaded with a new value, while another one of latches 304a–304d is selected for output through nodes 308a and 308b.

Figure 10C:
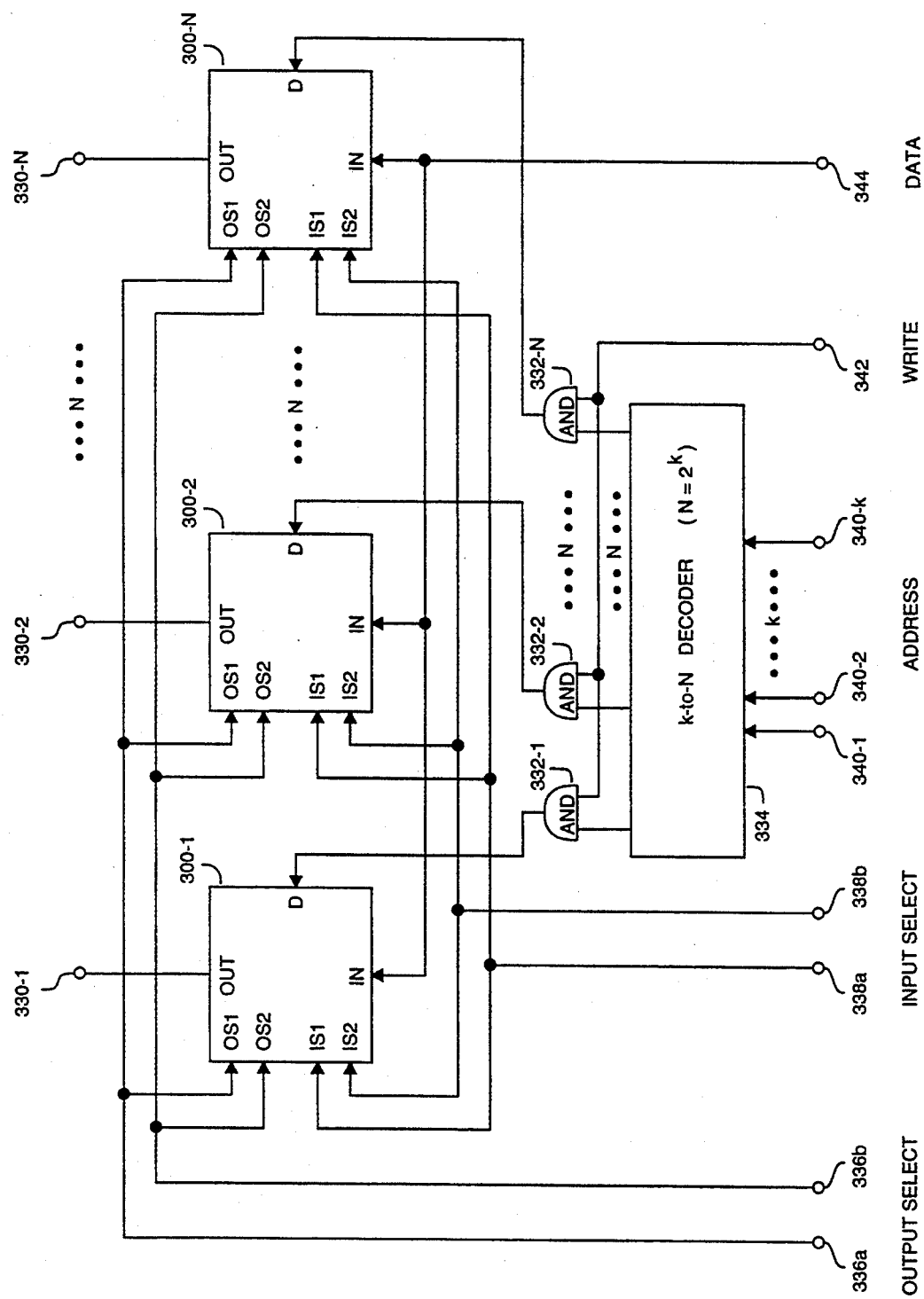
FIG. 10c shows an embodiment of a plurality of programmable memory elements of FIG. 10b and the circuitry used to reprogram them.

FIG. 10c shows: an embodiment of N programmable elements 3001 through 300-N, each of the type shown in FIG. 10b, and circuitry that allows selectively changing the values stored in the latches. For generality, an integer parameter "N" is used here to indicate the total number of programmable elements. The outputs OUT of programmable elements 300-1 through 300-N are connected to OUTPUT nodes 330-1 through 330-N. The data inputs IN of programmable elements 300-1 through 300-N are connected to a DATA node 344. Control inputs D of programmable elements 300-1 through 300-N are connected to the outputs of N two-input AND gates 332-1 through 332-N. Two-input AND gates 332-1 through 332-N have a first one of their inputs connected to a WRITE node 342, and a second one of their inputs each connected to one of N outputs of a k-to-N decoder 334. For generality, an integer parameter "k" is used here to indicate the number of inputs to k-to-N decoder 334. It is clear that in k-to-N decoder 334, N should be equal to $2^k$. k-to-N decoder 334 has k inputs each connected to one of k ADDRESS nodes 340-1 through 340-k.

The output-control inputs OS1 and OS2 of programmable elements 300-1 through 300-N are connected to OUTPUT SELECT nodes 336a and 336b. The input-control inputs IS1 and IS2 of programmable elements 300-1 through 300N are connected to INPUT SELECT nodes 338a and 338b.

When a high level is present on WRITE node 342, one of the N programmable elements 300-1 through 300-N has a high level on its control input D, corresponding to the combination of logic levels appearing on ADDRESS nodes 340-1 through 340-k. We refer to this programmable element as the "selected" programmable element.

Within each of programmable elements 340-1 through 340-N, four latches are present, labeled 304a through 304d in FIG. 10b. Hence, depending on the combination of logic levels present on INPUT SELECT nodes 338a and 338b, one of the four latches within the selected programmable element may be selected for input. The value of the latch selected for input may be changed to the value appearing on DATA node 344 by first applying a high logic level to WRITE node 342 and subsequently applying a low logic level to WRITE node 342.

Depending on the combination of logic levels present on OUTPUT SELECT nodes 336a and 336b, one of the four latches of each of programmable elements 300-1 through 300-N may be selected for output. Hence by setting the logic levels on 336a and 336b, one of four interconnection patterns may be selected. This feature adds merit to the present invention. For example, by going through the possible combinations of logic levels on nodes 336a and 336b in a periodical way in synchronization with a clock pulse, one of four different interconnection patterns is selected periodically. It is clear how this may increase the effective interconnection density without adding more bonding pads. As a second example, four different interconnection patterns corresponding to four different applications of the multi-chip system may be stored. Now, four applications may be executed on the multi-chip system sequentially without the need to reprogram the peripheral switch networks of the integrated circuits. It is also clear to those of ordinary skill in the art how a new interconnection pattern may be stored into a set of not selected latches of the programmable elements 300-1 through 300-N without changing the interconnection pattern currently selected. Returning now to the second example, during the execution of an application that uses a first interconnection pattern, three new interconnection patterns may be programmed into the latches that are not selected for output. This feature may be used when, in a set of applications that each require a different interconnection pattern, the application to be executed next depends on the outcome of the current application:

During execution of a first application, the interconnection patterns of the possible succeeding applications may be loaded into the latches not selected for output. When the first application is finished, three new applications are readily available and one may be selected depending on the outcome of the first application.

It is clear that the number of latches used in the embodiments of the programmable elements of FIGS. 10a through 10c may be changed to fit the needs of a particular design.

In a user-programmable logic array, the main circuitry comprises programmable logic modules with programmable interconnections between the terminals of the programmable logic modules. By using the same type of programmable elements as depicted in FIGS. 10a and 10b and programming circuitry as in FIG. 10c in the main circuitry, for setting the programming state of the programmable logic modules and the programmable interconnections, the selection of one of the inter-chip interconnection patterns may be synchronized with the selection of one of several logic circuits implemented in the main circuitry. Thus, a user-programmable multi-chip system is obtained with a number of applications readily available by setting of the selection inputs of the multiplexers, and of which the programming state may be changed during execution of an application without interrupting the execution. Also, by periodically selecting a different one of the settings of the memory elements, sychronized with a clock pulse, an application may now be implemented as a periodical sequence.

We are also convinced that a user-programmable logic array for single chip use, comprising programmable logic modules with programmable interconnections between the terminals of the programmable logic modules, in which the memory elements of FIG. 10a and 10b, and programming circuits similar to the ones shown in FIG. 10c, but without the peripheral switch network, has additional merit over user-programmable logic arrays for single chip use without such memory elements. Such a user-programmable logic array for single chip use may be programmed to contain a plurality of readily available applications, which may then be selected by setting the select inputs of the multiplexer of the memory element.

The embodiments shown in FIGS. 2 and 3 retain their merit with any type of circuitry, such as BiCMOS, bipolar, static CMOS, dynamic CMOS circuitry. By using analog amplifiers and analog switches, as known in the art, the architecture may be used for interconnecting analog circuits on different chips. Embodiments of the programmable I/O circuit and the programmable switch in these technologies are known in the art or may be obtained from the circuits depicted in FIGS. 4a through 6c and FIGS. 9a and 10c.

This detailed description of this invention is meant to be illustrative only and not limiting. Other embodiments of this invention will be obvious to those skilled in the art in view of this disclosure. In particular, the peripheral switch network may be organized in many different ways. FIG. 3, and the resulting "L-type connections" and "I-type connections" shows a currently preferred embodiment.

What is claimed is:

1. In an integrated circuit, an electrically programmable inter-chip interconnect architecture, comprising:

a core region, located centrally in said integrated circuit, comprising a plurality of core region circuits having first connection nodes, a frame region, surrounding said core region, comprising a peripheral switch network, said peripheral switch network having a plurality of second connection nodes corresponding to and connected to said first connection nodes of said core region circuits, said peripheral switch network having a plurality of bonding pads for interfacing with an external device, said peripheral switch network having a plurality of wiring channels, at least some of said wiring channels each having a first and a second conductive lead, each of said first conductive leads connecting said encompassing wiring channel to one of said bonding pads, said peripheral switch network having a plurality of programmable bidirectional I/O buffering circuits, each of said programmable bidirectional I/O buffering circuits located between said first and said second conductive lead, said programmable bidirectional I/O buffering circuits comprising means for providing at least a first programming state for signal propagation from said first conductive lead to said second conductive lead, and a second programming state for signal propagation from said second conductive lead to said first conductive lead, said peripheral switch network having a plurality of programmable junctions, said programmable junctions having two terminals and comprising means for providing a first programming state characterized by a high impedance between said two terminals and comprising means for providing a second programming state characterized by a bidirectional low impedance electrical connection between said two terminals, at least some of said programmable junctions being electrically connected between pairs consisting of two of said second conductive leads of two of said wiring channels connected to different ones of said bonding pads, and said peripheral switch network comprising means for providing a plurality of electrical connections between some of said second conductive leads and some of said second connection nodes.

2. The integrated circuit according to claim 1, wherein said peripheral switch network further comprises a plurality of third conductive leads, each connecting one of said second connection nodes and one of said second conductive leads.

3. The integrated circuit according to claim 1, wherein said peripheral switch network further comprises a plurality of fourth conductive leads, each connected to one of said second connection nodes, and at least some of said programmable junctions being electrically connected between pairs consisting of one of said second and one of said fourth conductive leads.

4. The integrated circuit according to claim 1, wherein at least some of said programmable junctions are electrically connected between pairs consisting of two of said first conductive leads of two of said wiring channels connected to different ones of said bonding pads.

5. The integrated circuit according to claim 1, wherein at least some of said programmable junctions are electrically connected between pairs consisting of one of said first conductive leads and one of said second conductive leads, of two of said wiring channels connected to different ones of said bonding pads.

6. The integrated circuit according to claim 1, wherein at least some of said wiring channels consist of a fifth conductive lead connected to one of said bonding pads,
   at least some of said programmable junctions having one terminal connected to one of said fifth conductive leads.

7. The integrated circuit according to claim 1, wherein at least some of said programmable bidirectional I/O buffering circuits comprise a tri-state buffer in parallel with an NMOS transistor and a PMOS transistor.

8. The integrated circuit according to claim 1, wherein at least some of said programmable bidirectional i/0 buffering circuits comprise means for providing a third programming state,
   said third programming state being characterized by a high impedance between between said first and said second conductive lead of said wiring channels.

9. The integrated circuit according to claim 1, wherein at least some of said programmable bidirectional I/O buffering circuits comprise a direction control input and comprise means for providing a fourth programming state,
   said fourth programming slate being characterized by a variable signal propagation direction through said programmable bidirectional I/O buffering circuits, said variable signal propagation direction being determined by said direction control input.

10. The integrated circuit according to claim 1, wherein at least some of said programmable bidirectional I/O buffering circuits and at least some of said programmable junctions further comprise:
    a plurality of memory elements storing values, said values determining said programming states of said=programmable bidirectional I/O buffering circuits and said programming states of said programmable junctions,
    and wherein said integrated circuit comprises means to selectively change at least some of said values stored in said memory elements during operation of said integrated circuit.

11. The integrated circuit according to claim 1, wherein at least some of said programmable bidirectional I/O buffering circuits and at least some of said programmable junctions further :comprise:
    a plurality of multiplexers each having a plurality of data inputs, each having a data output, and each having a plurality of selection inputs determining which one of said data inputs is propagated to said output,
    a plurality of sets of memory elements storing values and having outputs connected to at least some of said data inputs of said multiplexers,
    said outputs of said multiplexers determining said programming state of said programmable bidirectional I/O buffering circuits and said programmable junctions,
    wherein said integrated circuit comprises means to collectively change said selection inputs of said multiplexers.

12. The integrated circuit according to claim 11, wherein said integrated circuit comprises means to selectively change the value stored in at least some of said memory elements during operation of said integrated circuit.

13. The integrated circuit according to claim 1, wherein said core region circuits comprise a user-programmable logic array.

14. The integrated circuit according to claim 1, wherein said core region circuits comprise a memory.

15. The integrated circuit according to claim 1, wherein said core region circuits comprise a microprocessor.

16. The integrated circuit according to claim 1, wherein said core region circuits comprise functional blocks selected from the group consisting of digital signal processors, arithmetics processors, neural networks, and electro-optical interfaces for fiber optics communications.

17. In an integrated circuit, an improvement, where the improvement comprises including an electrically programmable inter-chip interconnect architecture, said inter-chip interconnect architecture comprising:
    a core region, located centrally in said improved integrated circuit, comprising a plurality of functional blocks being selected from the group of circuits present on said integrated circuit before said improvement, said functional blocks having a plurality of first connection nodes,
    a frame region, surrounding said core region, comprising a peripheral switch network, said peripheral switch network having a, plurality of second connection nodes corresponding to and connected to said first connection nodes, and having a plurality of bonding pads,
    said peripheral switch network having a plurality of wiring channels, at least some of said wiring channels each having a first and a second conductive lead, each of said first conductive leads connecting said encompassing wiring channel to one of said bonding pads,
    said peripheral switch network having a plurality of programmable bidirectional I/O buffering circuits, each of said programmable bidirectional I/O buffering circuits located between said first and said second conductive lead, said programmable bidirectional I/O buffering circuits comprising means for providing at least a first programming state for signal propagation from said first conductive lead to said second conductive lead, and a second programming state for signal propagation from said second conductive lead to said first conductive lead,
    said peripheral switch network having a plurality of programmable junctions, said programmable junctions having two terminals and comprising means for providing a first programming static characterized by a high impedance between said two terminals and comprising means for providing a second programming state characterized by a bidirectional low impedance electrical connection between said two terminals,
    at least some of said programmable junctions being electrically connected between pairs consisting of two of said second conductive leads of two of said wiring channels connected to different ones of said bonding pads, said peripheral switch network comprising means for providing a plurality of electrical connections between some of said second conductive leads and some of said second connection nodes.

18. In an apparatus comprising a plurality of integrated circuits, mounted on a substrate, said substrate having external contacts for interfacing with a device external to said apparatus, said substrate providing fixed electrically conductive traces between a first plurality of bonding pads of said integrated circuits, and between a second plurality of bonding pads of said integrated circuits and said external contacts, an improvement, said improvement comprising including an electrically programmable inter-chip interconnect architecture in at least one of said integrated circuits, said inter-chip interconnect architecture comprising:

a core region, located centrally in said improved integrated circuit, comprising a plurality of functional blocks being selected from the group of circuits present on said integrated circuit before said improvement, said functional blocks having a plurality of first connection nodes, a frame region surrounding said core region, comprising a peripheral switch network, said peripheral network having a plurality of second connection nodes corresponding to and connected to said first connection nodes, and having a plurality of bonding pads, having a plurality of wiring channels, at least some of said wiring channels each having a first and a second conductive lead, each of said first conductive leads connecting said encompassing wiring channel to one of said bonding pads, said peripheral switch network having a plurality of programmable bidirectional I/O buffering circuits, each of said programmable bidirectional I/O buffering circuits located between said first and said second conductive lead, said programmable bidirectional I/O buffering circuits comprising means for providing at least a first programming state for signal propagation from said first conductive lead to said second conductive lead, and a second programming state for signal propagation from said second conductive lead to said first conductive lead, said peripheral switch: network having a plurality of programmable junctions, said programmable junctions having two terminals and comprising means for providing a first programming state characterized by a high impedance between said two terminals and comprising means for providing a second programming state characterized by a bidirectional low impedance electrical connection between said two terminals, at least some of said programmable junctions being electrically connected between pairs consisting of two of said second conductive leads of two of said wiring channels connected to different ones of said bonding pads, said peripheral switch network comprising means for providing a plurality of electrical connections between some of said second conductive leads and some of said second connection nodes.

19. The apparatus according to claim 18, wherein at least some of said integrated circuits comprise a user-programmable logic array.

20. The apparatus according to claim 18, wherein at least some of said integrated circuits comprise a memory.

21. The apparatus according to claim 18, wherein at least some of said integrated circuits comprise a microprocessor.

* * * * *